(12) United States Patent
Kino

(10) Patent No.: US 6,832,101 B1
(45) Date of Patent: Dec. 14, 2004

(54) IMAGE REGISTRATION SERVER AND AN IMAGE MEDIATION DISTRIBUTING SYSTEM

(75) Inventor: Shigenori Kino, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 342 days.

(21) Appl. No.: 10/169,604

(22) PCT Filed: Nov. 8, 2000

(86) PCT No.: PCT/JP00/07823

§ 371 (c)(1),
(2), (4) Date: Jul. 3, 2002

(87) PCT Pub. No.: WO02/39743

PCT Pub. Date: May 16, 2002

(51) Int. Cl.[7] .......................... H04B 1/30; H04M 1/00; H04M 3/42; H04M 3/00

(52) U.S. Cl. .................. 455/550.1; 455/414.1; 455/418; 455/3.06; 348/211.2

(58) Field of Search ............................ 455/3.05, 3.06, 455/414.1, 418, 550.1, 66.1, 556.1, 557; 709/201, 203, 223, 224; 348/211.1–211.3, 330.08, 374, 375, 376, 211.8, 207.99

(56) References Cited

U.S. PATENT DOCUMENTS

| | | | | |
|---|---|---|---|---|
| 2003/0058343 A1 | * | 3/2003 | Katayama | 348/207.1 |
| 2003/0058353 A1 | * | 3/2003 | Tsue | 348/231.2 |
| 2003/0181200 A1 | * | 9/2003 | Iida | 455/414.1 |
| 2003/0184653 A1 | * | 10/2003 | Ohkubo | 348/207.1 |
| 2004/0001148 A1 | * | 1/2004 | Takemoto | 348/211.8 |
| 2004/0053637 A1 | * | 3/2004 | Iida | 455/550.1 |

FOREIGN PATENT DOCUMENTS

| | | |
|---|---|---|
| JP | 05-344460 | 12/1993 |
| JP | 8-96264 A | 4/1996 |
| JP | 08-096264 | 4/1996 |
| JP | 10-143520 | 5/1998 |
| JP | 10-224676 | 8/1998 |
| JP | 11-17921 A | 1/1999 |
| JP | 11-017921 | 1/1999 |
| JP | 11-288422 | 10/1999 |
| JP | 11-288422 A | 10/1999 |
| JP | 2000-184353 | 6/2000 |
| JP | 2000-184353 A | 6/2000 |
| JP | 2000-209542 | 7/2000 |
| JP | 2000-209542 A | 7/2000 |

* cited by examiner

Primary Examiner—Nick Corsaro
Assistant Examiner—Edan Orgao
(74) Attorney, Agent, or Firm—Birch, Stewart, Kolasch & Birch, LLP.

(57) ABSTRACT

It is aimed to provide a system for collecting, storing and distributing a photographic subject image which an image reader wants to watch, by intermediating an image photographer who photographs an image of a photographic subject using portable equipment with a digital camera function and the image reader who acquires the photographed image via a data communications network. A photographic subject list registration part 13 registers a photographic subject list where photographic subject specification information input by an input part 11 of photographic subject specification information from a registrant terminal corresponds to a photographic subject identifier. A photographic subject list disclose part 14 discloses the photographic subject list. An input part 15 of a photographic subject image application inputs a photographic subject identifier used for identifying a photographic subject which an applicant wants to be photographed, and a disclose part 17 of photograph application collection list discloses it to a photographer. A photographic subject image registration part 18 registers the photographed image, and a registration image distribution part 32 distributes the registered photographed image.

14 Claims, 30 Drawing Sheets

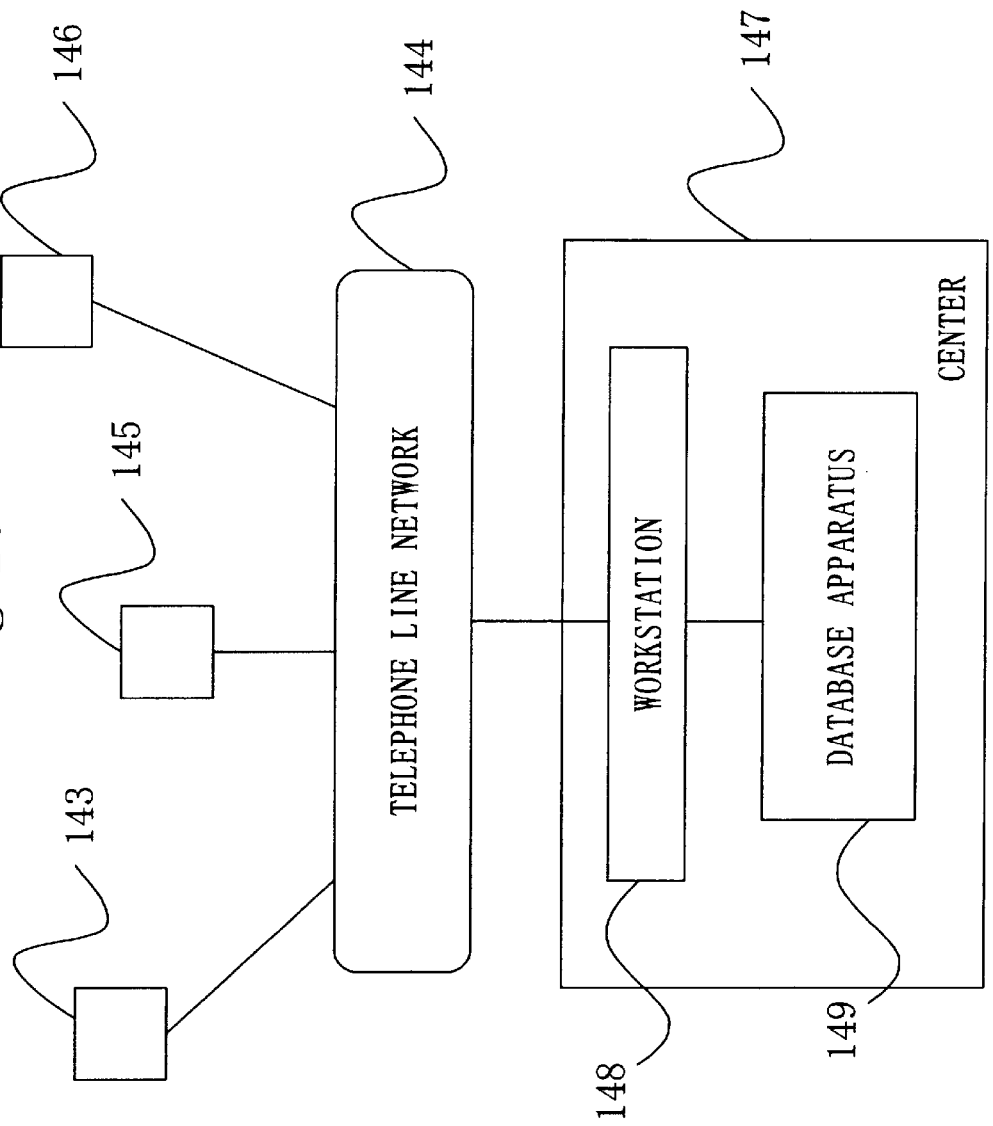

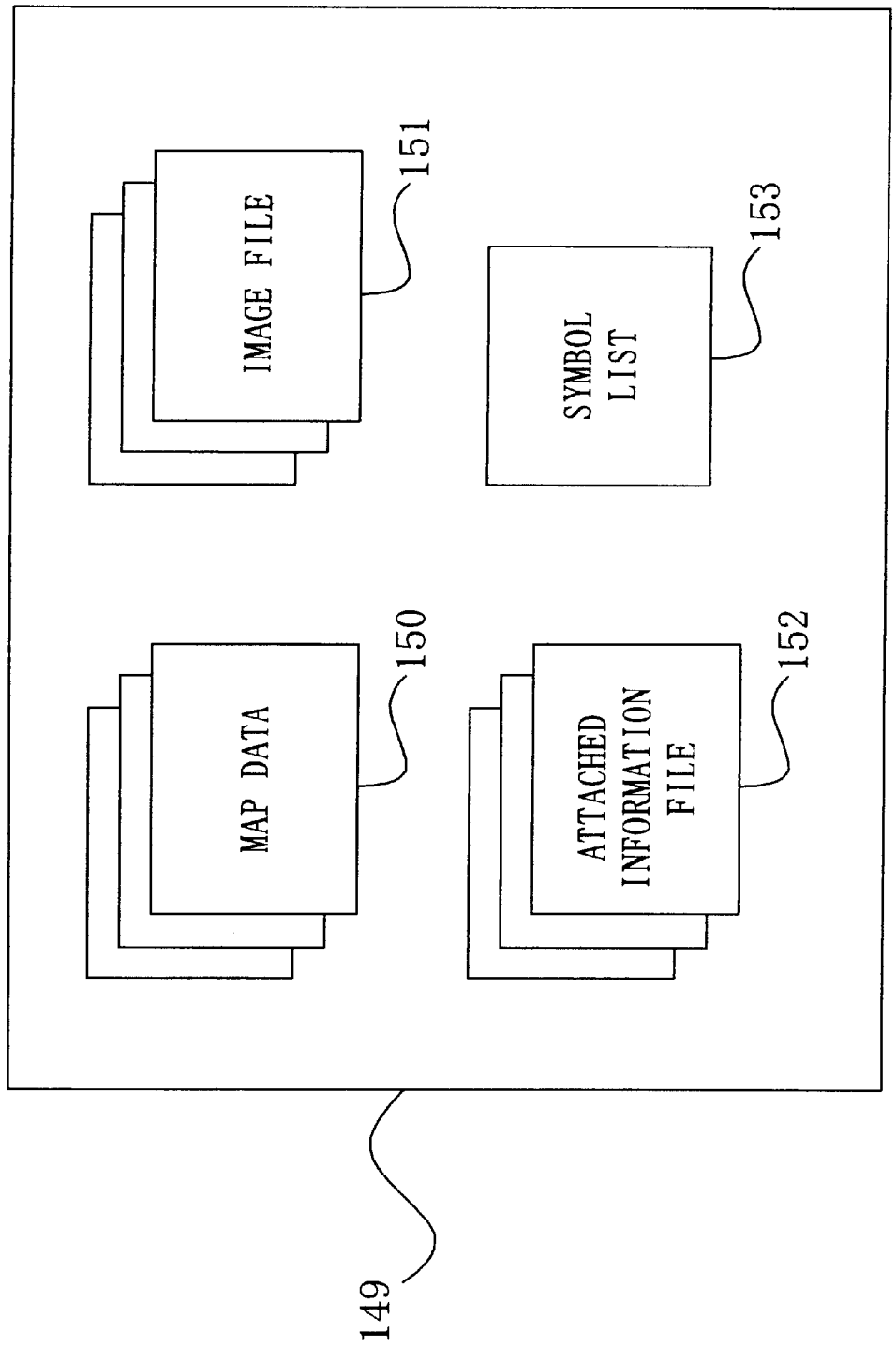

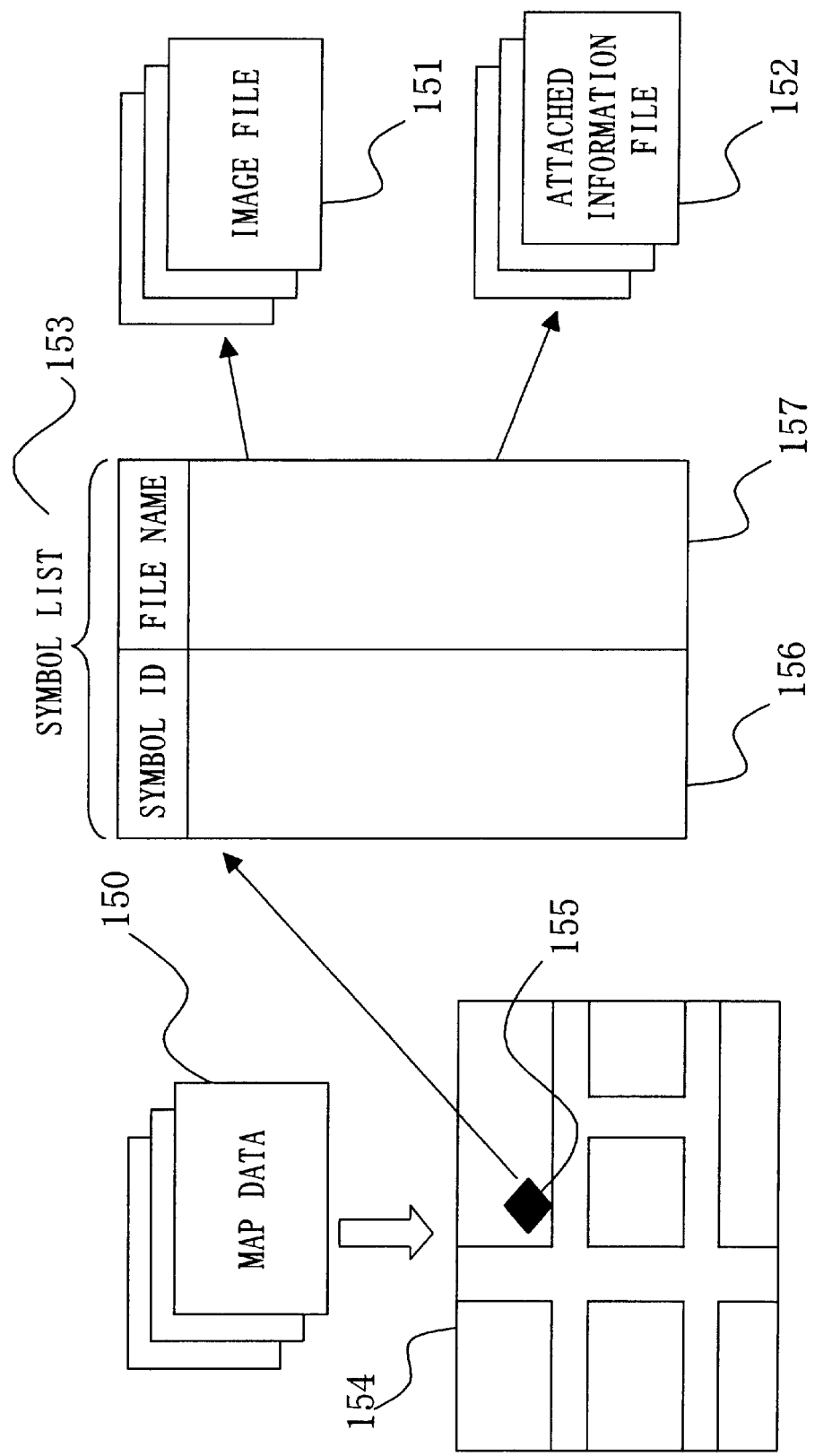

IMAGE REGISTRATION SERVER AND AN IMAGE MEDIATION DISTRIBUTING SYSTEM

This application is the national phase under 35 U.S.C. § 37.1 of PCT International Application No. PCT/JP00/07823 which has an International filing date of Nov. 8, 2000, which designated the United States of America.

TECHNICAL FIELD

The present invention relates to an intermediary distribution method of a photographic subject image, which collects, stores and distributes a photographic subject image that an image reader wants to watch, by intermediating an image photographer who photographs an image of a photographic subject using portable equipment with a digital camera function and the image reader who extracts a photographed image onto portable equipment at hand via a data communications network. It is especially related with a method of specifying a photographic subject image, and a method of photographing an image of the specified photographic subject, registering the photographed image and acquiring the specified image by utilizing the data communications network.

BACKGROUND ART

As a conventional art example 1, a recording classification system for a photographed image by using an electronic still camera based on a classification code, disclosed in "Recording Classification System for an Electronic Still Camera" of Japanese Unexamined Patent Publication No. 5-344460 will now be described. FIG. 25 shows a configuration illustrating the recording classification system for an electronic still camera. FIG. 25 shows a part selected from the figure in Japanese Unexamined Patent Publication No. 5-344460 because the part considered to be related to the present invention.

In FIG. 25, the following are provided: an electronic still camera 100 for photographing a digital image, a key input part 101 for inputting a classification code etc. into the electronic still camera, a memory part 102 for storing an image of the electronic still camera 100 and a classification code, an LCD 103 for displaying an image of the electronic still camera 100 and a character, a classification mode key 104, a classification code input key 105, a multi-code key 106, a track map key 107, a classification code display key 108, and a classification code delete key 109.

In the "Recording Classification System for an Electronic Still Camera", a classification code is input for each photographic subject image photographed by the electronic still camera 100, utilizing the classification mode key 104 and the classification code input key 105 of the key input part 101. Then, the image and the classification code are recorded in the memory part 102.

When displaying the image on the LCD 103, the classification code is again input from the classification code input key 105, and the image corresponding to the classification code is displayed one by one from the memory part 102.

In the conventional art example 1, the classification code is used for classifying and searching a photographic subject image which has been photographed, and is not used for specifying a photographic subject. Therefore, it is impossible to specify a photographic subject by using the classification code. Moreover, this classification code is assigned to another image in other electronic still cameras. Naturally, photographic subjects of images between other electronic still cameras are different. Therefore, generally, the classification code is not a code that is used for identifying only one photographic subject image. A role of the classification code is just classifying a photographic subject image in a specific electronic still camera.

As a conventional art example 2, a specification and transmission system of a photographed image using an image number, disclosed in "Digital Camera" of Japanese Unexamined Patent Publication No. 10-224676 will now be described. FIG. 26 shows a part selected from the figure in Japanese Unexamined Patent Publication No. 10-224676 because the part considered to be related to the present invention.

In FIG. 26, the following are provided: a digital camera 120, a control part 121 of the digital camera 120, a lens 122, a digital image photograph part 123 for changing an input through a lens into an image, and an image number produce part 124 for producing an image number to be inserted in a photographed image. In addition, as described in Japanese Unexamined Patent Publication No. 10-224676, the image number is also used as a file name in the case of storing a photographed image in the digital camera 120, and it is possible to search a photographed image by using the image number. A character line insert part 125 for inserting a produced image number into a photographed image, a wireless part 126 for transmitting a photographed image to an image data processing apparatus in a remote place, a WWW server/client part 127 for performing a data transmission with the data-processing apparatus in a remote place by using the wireless part, a large-sized display part 128, a memory part 129 for storing a photographed image, photograph conditions and a character line to be inserted in a photographed image, and an operation part for 130 for inputting photograph conditions.

In Japanese Unexamined Patent Publication No. 10-224676, it is descried about a digital camera which has a function to transmit image data stored in a memory part of the digital camera to a data-processing apparatus in a remote place by wireless. The digital camera 120 in this document projects an image number produced in the image number produce part 124 onto image data to be transmitted, and the image to be transmitted is identified by this image number. Furthermore, this image number is also used as a file name at the time of storing in the memory part 129.

Unlike the conventional art example 1, this image number is not used for classifying an image but used for identifying a photographic image of the subject, and it is possible to specify an image on the digital camera 120. Photograph conditions are input from the operation part 130, and temporarily stored in the memory part 129. Then, it is also possible to copy the photograph conditions into a photographed image as a character line by using the character line insert part 125. However, the image number described in Japanese Unexamined Patent Publication No. 10-224676 is used for specifying an image but not used for specifying a photographic subject itself. Though it is possible to specify an image which has been photographed by using the image number and to assign the image number to an image to be photographed, it is not possible to specify a photographic subject.

Moreover, though the image number is produced in the image number produce part 124 of the digital camera 120 and assigned to a photographic subject image, conditions outside of the digital camera 120 are not taken into consideration. For example, as a number is assigned independently in other digital camera 120, it could happen to assign the same number for different photographic subject images in two digital cameras. Therefore, for the above reason, when images are transmitted from a plurality of digital cameras to a data-processing apparatus, it is not guaranteed that an image number is not duplicated. Then, it is impossible to build an image database where registration and search of a photographed image is performed by the image number.

As a conventional art example 3, image database registration/search system using a symbol ID disclosed in "Multimedia Information Terminal Apparatus" of Japanese Unexamined Patent Publication No. 10-143520 will now be described.

FIGS. 27 through 30 show parts selected from the figures in Japanese Unexamined Patent Publication No. 10-143520 because the parts considered to be related to the present invention. Regarding FIG. 29, in order to clarify the relation with the present invention, the "file management data" described in Japanese Unexamined Patent Publication No. 10-143520 is replaced with a "symbol list" in the present invention, and the "GPS information file" in Japanese Unexamined Patent Publication No. 10-143520 is replaced with an "attached information file".

FIG. 27 shows a configuration of information terminal side according to an image file management system by using a symbol ID, based on a multimedia information terminal and a database. In FIG. 27, the following are provided: a digital camera 140, a portable type personal computer 141, a hard disk drive 142 which is a memory storage of the portable type personal computer 141, and a cellular phone 143 having a wireless-data-transmission function.

FIG. 28 shows a configuration of database apparatus side according to the same system. In FIG. 28, a telephone line network 144, a cellular phone (#2) 145 connected to the digital camera 140, and a cellular-phone (#3) 146 connected to the portable type personal computer 141 are provided. A center 147 has a database apparatus and is connected to the telephone line network 144. The center 147 is composed of a workstation 148 and a database apparatus 149.

FIG. 29 shows contents of the database apparatus 149 in the center 147. Map data 150, an image file 151, an attached information file 152, and a symbol list 153 in which an ID assigned to a symbol on a map is related with a file corresponding to the symbol ID, are shown in FIG. 29.

FIG. 30 shows a role of the symbol list 153. A map 154 produced by the map data 150, a symbol 155 assigned to one point on a map, a symbol ID 156 which the center 147 assigns to the symbol 155 through the workstation 148, and a file name 157 indicating a name of a file relating to the symbol ID 156 are shown in FIG. 30.

With reference to the figure, a method of photographing a photographic subject image and registering it in the database, and a role of the symbol ID will now be explained. The conventional art example 3 describes a system for registering a photographic subject image at a construction site to be related with a map. After an image of the construction site is photographed by the digital camera 140, the photographed image is temporality stored at the HDD 142 of the portable type personal computer 141. Then, by utilizing the data communications function of the cellular phone 143, the stored photographed image is sent to the center 147 through the telephone line network 144. The received image is stored as an image file in the database apparatus 149 by the workstation 148 of the center 147. At this time, the name of the image file is defined by the center 147, and information about the photograph position on the map is stored in the database apparatus 149 to be related with attached information about the construction site. As shown in FIG. 30, the map 154 is produced from the map data 150, and the symbol 155 is assigned to the place where the image was photographed on the map. Then, the symbol ID 156 is assigned to the symbol 155, and information about the photographic subject represented by the symbol 155 is input as attached information. The center 147 also defines a file name of the input attached information, and registers the file name as the file name 157 of the symbol list 153. The file name of the image file 151 is also registered in the file name 157 of the symbol list 153. In this way, the image represented by the symbol is written in the image file 151, and its attached information is written in the attached information file 152. Therefore, it is possible to search the image and the attached information to be related each other by referring to the symbol list 153 using the symbol ID 156.

There is no description about a means by which a photographer carrying the digital camera 140, the portable type personal computer 141, and the cellular phone 143 in a set shares a symbol ID and attached information about the symbol ID with the center 147. However, even if the means to share the symbol ID and the attached information is described, as the symbol ID is an identifier relating the position on the map with the symbol, the symbol ID has the following faults. Since it is impossible to assign the symbol ID to a photographic subject which cannot be specified on the map, such as a moving person or train, the photographic subject cannot be specified. For this reason, it is not possible to request the third party to photograph a moving photographic subject, by utilizing the symbol ID.

In Japanese Unexamined Patent Publication No. 10-143520, it is suggested to save the time and effort of the database production and to increase the efficiency of the database production by giving position information on a spot with utilizing position information of GPS (Global Positioning System). However, it is clear that no photographic subject identifier can be assigned to a moving photographic subject. Moreover, different photographic subjects in the same place cannot be identified. For example, though the appearance of a certain building, the interior of the building, or a state of an employee in the building are different as photographic subjects, their positions are located at the same position on the map. These photographic subjects are not distinguishable based on the symbol IDs of the conventional art example 3.

The photograph image identifier introduced in the three conventional art examples, such as a "classification code", "image number", and "symbol ID" is an identifier defined for identifying an image which has been photographed or an image to be photographed, and not for identifying the photographic subject itself. Therefore, in the three conventional art examples, it is impossible to make the identifiers themselves common property among people by means of putting the photographic subject identifiers open to the public. It is also impossible in the three conventional art examples to request a user of portable equipment having a digital camera function to photograph an image of a specific photographic subject through a communication network depending upon a photographic subject identifier being open to the public to be shared. Especially, it is impossible to request many persons to photograph a moving photographic subject.

It is a subject that a person who wants to acquire an image of a specific photographic subject can easily indicate his or her intention through the data communications network from the portable equipment such as a cellular phone.

Moreover, it is intended that the intention of acquiring the image of the specific photbgraphic subject is transmitted to a user of portable equipment having a digital camera function through the data communications network, the photographic subject is photographed by the user of portable equipment instead of the person who wants to acquire the image of the specific photographic subject, and the photographic subject image which has been photographed is easily registered in an image registration server through the data communications network.

It is also intended that the person who wants to acquire the image of the specific photographic subject can know in a short time that the specific photographic subject image has already been registered in the image registration server, through the data communications network, and can easily acquire the desired photographic subject image through the data communications network only by inputting a photographic subject identifier. Especially, when the image of the specific photographic subject is urgently needed, it is intended to be useful for greatly shortening the time period from requesting many and unspecified users of portable equipment to photograph the specific photographic subject to acquiring the image of the photographic subject.

DISCLOSURE OF THE INVENTION

An image registration server according to the present invention can be connected, through a data communications network, to a registrant terminal used by a registrant who registers a photographic subject to be photographed, to an applicant terminal used by an applicant who wants the photographic subject to be photographed and an image of the photographic subject to be distributed, and to a photographer terminal used by a photographer who photographs the photographic subject. The image registration server includes:

1) an input part of photographic subject specification information, for inputting photographic subject specification information which specifies the photographic subject, from the registrant terminal through the data communications network,
2) a photographic subject list registration part for registering a photographic subject list where input photographic subject specification information corresponds to a photographic subject identifier for identifying the photographic subject,
3) a photographic subject list disclose part for disclosing a registered photographic subject list to the applicant terminal and the photographer terminal through the data communications network,
4) an input part of a photographic subject image application, for inputting the photographic subject identifier which specifies the photographic subject whose photograph the applicant wants to be photographed, from the applicant terminal through the data communications network,
5) a photograph application collection list disclose part for disclosing a photograph application collection list including an input photographic subject identifier to the photographer terminal through the data communications network, and for urging the photographer to photograph the photographic subject,
6) a photographic subject image registration part for inputting the image of the photographic subject and the photographic subject identifier of the photographic subject from the photographer terminal through the data communications network, and for registering an input image of the photographic subject and an input photographic subject identifier of the photographic subject,
7) a registration image list disclose part for disclosing a registration image list including the photographic subject identifier of the photographic subject to the applicant terminal through the data communications network, and for urging the applicant to acquire the image,
8) an input part of a distribution image photographic subject identifier, for inputting the photographic subject identifier which identifies the photographic subject of the image requested to be distributed, from the applicant terminal through the data communications network, and
9) a registration image distribution part for distributing the image of the photographic subject identified by an input photographic subject identifier to the applicant terminal through the data communications network.

An image intermediary distribution system according to the present invention includes a photographic subject identifier manage server and an image registration server. The photographic subject identifier manage server can be connected, through a data communications network, to a registrant terminal used by a registrant who registers a photographic subject to be photographed. The image registration server can be connected, through the data communications network, to an applicant terminal used by an applicant who wants the photographic subject to be photographed and an image of the photographic subject to be distributed, to a photographer terminal used by a photographer who photographs the photographic subject, and to the photographic subject identifier manage server.

The photographic subject identifier manage server includes: an input part of photographic subject specification information, for inputting photographic subject specification information which specifies the photographic subject, from the registrant terminal through the data communications network, a photographic subject list registration part for registering an open photographic subject list where input photographic subject specification information corresponds to a photographic subject identifier for identifying the photographic subject, and a photographic subject list disclose part for disclosing a registered open photographic subject list to public people through the data communications network.

The image registration server includes: an open photographic subject list collection part for inputting at least a part of the open photographic subject list from the photographic subject identifier manage server through the data communications network and for registering an input open photographic subject list as a photographic subject list, an input part of a photographic subject image application for inputting the photographic subject identifier which specifies the photographic subject whose photograph the applicant wants to be photographed from the applicant terminal through the data communications network, a photograph application collection list disclose part for disclosing a photograph application collection list including an input photographic subject identifier to the photographer terminal through the data communications network and for urging the photographer to photograph the photographic subject, a photographic subject image registration part for inputting the image of the photographic subject and the photographic subject identifier of the photographic subject from the photographer terminal through the data communications network and for registering an input image of the photographic subject and an input photographic subject identifier of the photographic subject, a registration image list disclose part for disclosing a registration image list including the photographic subject identifier of the photographic subject to the applicant terminal through the data communications network and for urging the applicant to acquire the image, an input part of a distribution image photographic subject identifier, for inputting the photographic subject identifier which identifies the photographic subject of the image requested to be distributed, from the applicant terminal through the data communications network, and a registration image distribution part for distributing the image of the photographic subject identified by an input photographic subject identifier to the applicant terminal through the data communications network.

The input part of a photographic subject image application inputs the photographic subject identifier composed of numbers and signs assigned to dial buttons of a cellular phone terminal, from the cellular phone terminal being the applicant terminal.

The input part of a photographic subject image application inputs the photographic subject identifier composed of numbers and signs assigned to dial buttons of a cellular phone terminal, from the cellular phone terminal being the applicant terminal.

The photographic subject image registration part inputs the photographic subject identifier composed of numbers and signs assigned to dial buttons of a cellular phone terminal, from the cellular phone terminal being the photographer terminal.

The photographic subject image registration part inputs the photographic subject identifier composed of numbers and signs assigned to dial buttons of a cellular phone terminal, from the cellular phone terminal being the photographer terminal.

The input part of a photographic subject image application inputs the photographic subject identifier composed of numbers, signs, alphabets, and pause marks from a cellular phone terminal being the applicant terminal.

The input part of a photographic subject image application inputs the photographic subject identifier composed of numbers, signs, alphabets, and pause marks from a cellular phone terminal being the applicant terminal.

The photographic subject image registration part inputs the photographic subject identifier composed of numbers, signs, alphabets, and pause marks from a cellular phone terminal being the photographer terminal.

The photographic subject image registration part inputs the photographic subject identifier composed of numbers, signs, alphabets, and pause marks from a cellular phone terminal being the photographer terminal.

The photographic subject image registration part registers when the input photographic subject identifier corresponds to the photographic subject identifier included in the photographic subject list.

The photographic subject image registration part registers when; the input photographic subject identifier corresponds to the photographic subject identifier included in the photographic subject list.

The input part of photographic subject specification information further inputs a photograph equipment identifier for identifying photograph equipment, the photographic subject list registration part further registers the photographic subject list where an input photograph equipment identifier corresponds to the photographic subject identifier, and the photographic subject image registration part further inputs the photograph equipment identifier for identifying the photograph equipment used for photographing the image and registers when the input photograph equipment identifier corresponds to the photograph equipment identifier included in the photographic subject list.

The input part of photographic subject specification information further inputs a photograph equipment identifier for identifying photograph equipment, the photographic subject list registration part further registers the photographic subject list where an input photograph equipment identifier corresponds to the photographic subject identifier, and the photographic subject image registration part further inputs the photograph equipment identifier for identifying the photograph equipment used for photographing the image and registers when the input photograph equipment identifier corresponds to the photograph equipment identifier included in the photographic subject list.

BRIEF DESCRIPTION OF THE DRAWINGS

FIG. 28 shows a configuration of database apparatus side according to the conventional art example 3;

FIG. 29 shows contents of the database apparatus according to the conventional art example 3; and FIG. 30 shows a role of a symbol list according to the conventional art example 3.

BEST MODE FOR CARRYING OUT THE INVENTION

Terms will be explained first. "Intermediary distribution of a photographic subject image" aims to intermediate a person who can photograph an image of a specific photographic subject and offer the photographed image, called a photographer henceforth, and a person who wants to acquire an image of a specific photographic subject, called an applicant henceforth, to provide a desired photographic subject image for the applicant through a data communications network as immediately as possible, to enable the photographer to photograph a photographic subject image with effectively utilizing his or her opportunity of photographing the subject, and to enable the photographer to provide the photographic subject image to people as many as possible who need to acquire the photographic subject image.

A photographic subject registrant indicates a person who proposes a photographic subject as an object of the intermediary distribution of a photographic subject image. An applicant, a photographer, or the third party can be the registrant. Photographic subject registration is composed of steps of inputting information which specifies the photographic subject and assigning a photographic subject identifier corresponding to the photographic subject. When the photographic subject identifier is not yet assigned to the photographic subject which is desired to be photographed, an applicant can be a photographic subject registrant. Regarding the photographic subject which the photographer judges to be worth registering in an image registration server though a photographic subject identifier has not yet been assigned to the photographic subject, the photographer as a photographic subject registrant can request to assign a photographic subject identifier to the photographic subject.

The photographic subject implies all the things that can be an object of photography, such as a still life, an animal, a man, and a moving thing. The information for specifying the photographic subject is photographic subject specification information. Regarding a scene, if there is enough photographic subject information which uniquely defines the scene as only one photographic subject object, the scene can be a photographic subject.

A photographic subject identifier is composed of character elements to be used in common in various portable equipment, such as dial button elements of a cellular phone: 01#427453.

Embodiment 1.

Figure 1:
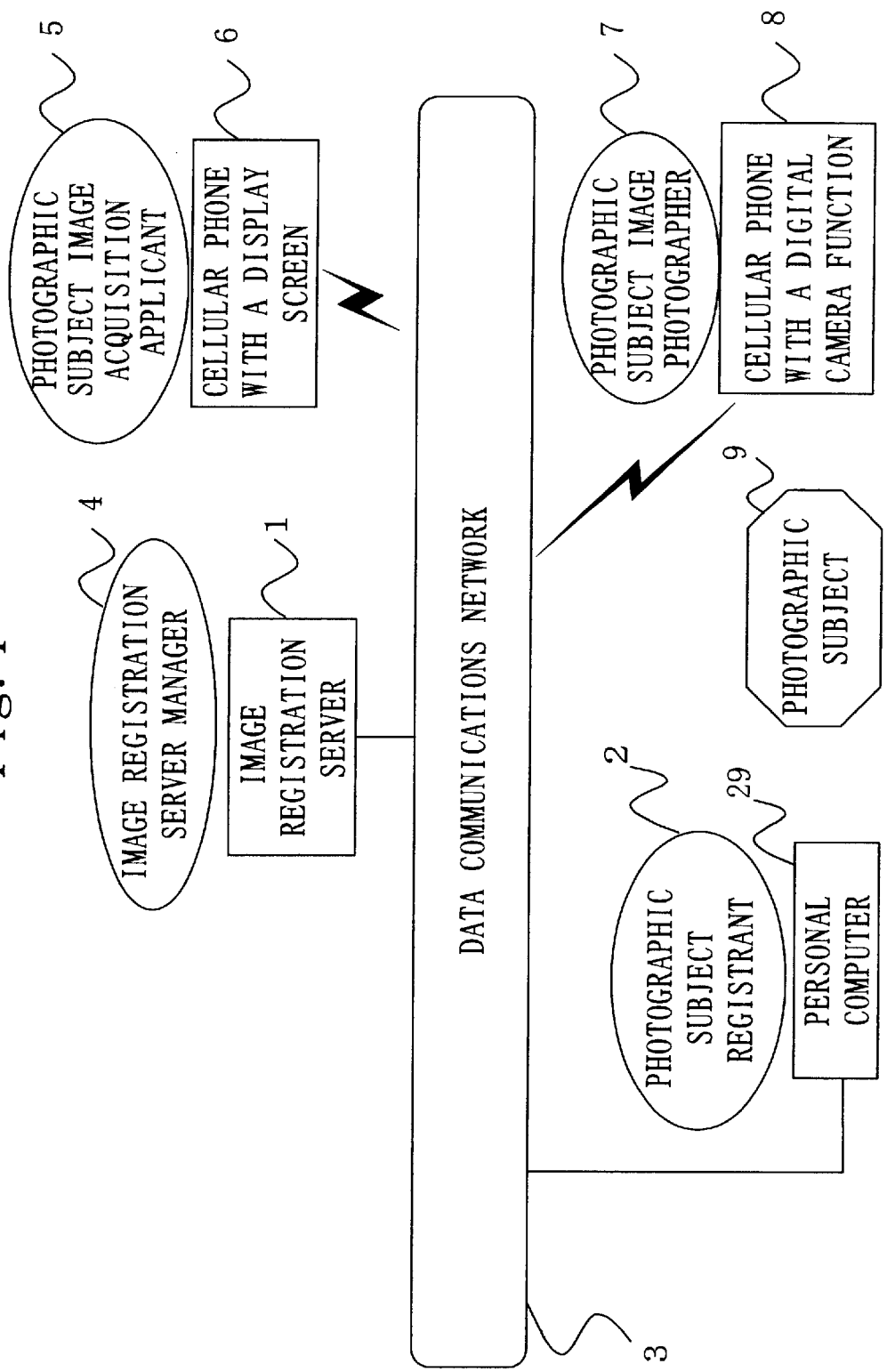
FIG. 1 shows a configuration of a photographic subject image intermediary distribution system according to Embodiment 1.

FIG. 1 shows a configuration of a photographic subject image intermediary distribution system according to Embodiment 1. This system is a photographic subject list limited display type system in which an image registration server assigns a photographic subject identifier.

An image registration server 1 connected to a data communications network takes charge of intermediary distribution of a photographic subject image, image storage, and so forth, and is managed by an image registration server manager.

A photographic subject registrant 2 registers a photographic subject for the photographic subject image intermediary distribution, and a personal computer 29 is connected to the data communications network used by the photographic subject registrant 2. The photographic subject registrant 2 notifies the image registration server 1 of photographic subject specification information for specifying a photographic subject, by using a personal computer 29.

A data communications network 3 is herein described as the Internet utilizing IP (Internet Protocol) as an example.

An image registration server manager 4 which manages the image registration server 1, specifies a photographic subject based on the photographic subject specification information notified by the photographic subject registrant 2, and assigns a photographic subject identifier to the photographic subject.

5 denotes a photographic subject image acquisition applicant. 6 denotes a cellular phone with a display screen, which the applicant 5 utilizes. 7 denotes a photographic subject image photographer who photographs a photographic subject image. 8 denotes a cellular phone with a digital camera function, which the photographer 7 uses. 9 denotes a photographic subject. Both of the cellular phone 6 with a display screen and the cellular phone 8 with a digital camera function have the function of connecting to the data communications network 3 by using wireless phone circuits.

Figure 2:
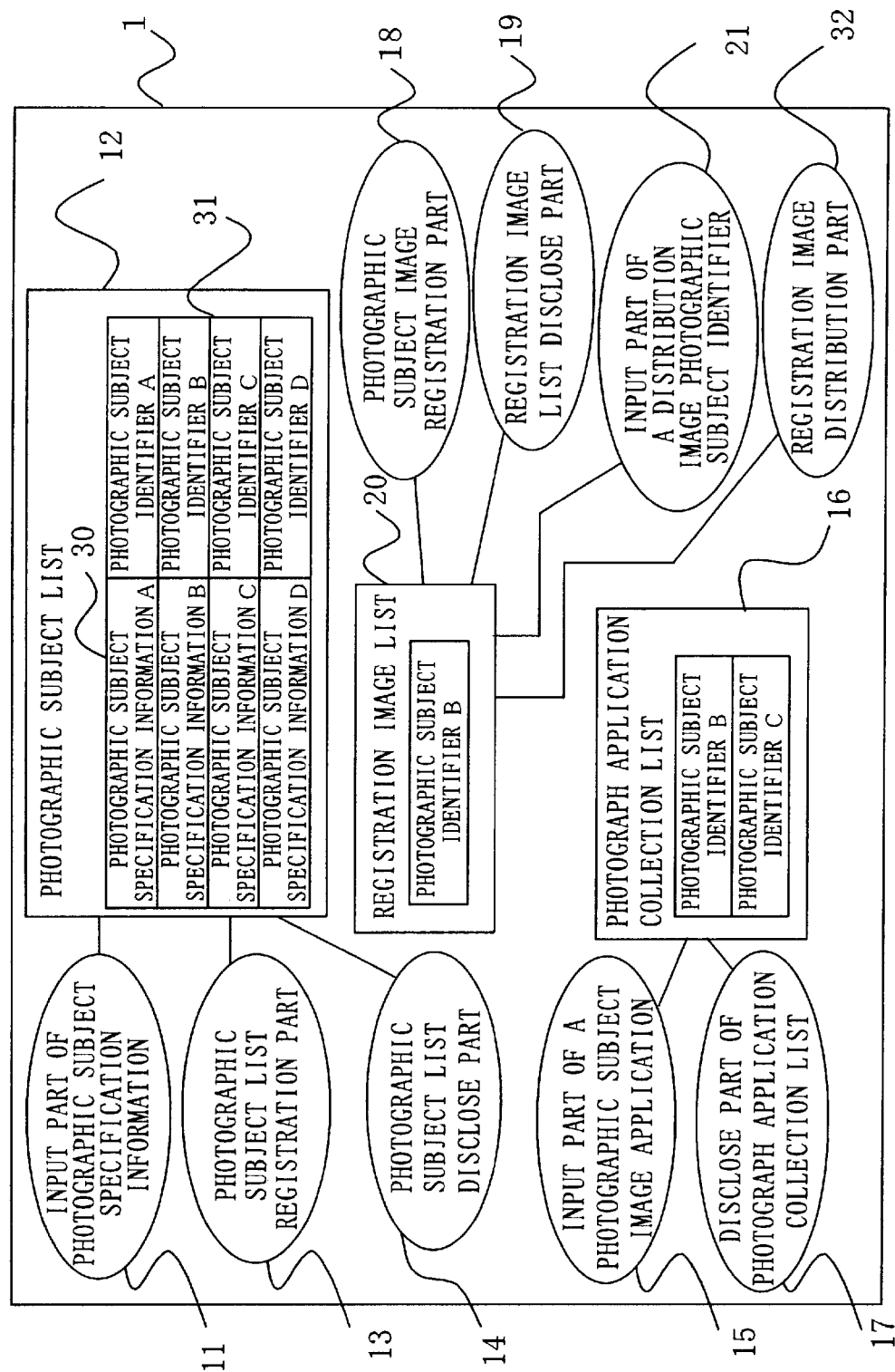
FIG. 2 shows a configuration of an image registration server according to Embodiment 1.

FIG. 2 shows a configuration of the image registration server according to Embodiment 1. An input part 11 of photographic subject specification information is for the image registration server manager 4. The image registration server manager 4 inputs a photographic subject identifier which is assigned to a photographic subject by the image registration server manager 4 itself, with photographic subject specification information, via the input part 11 of photographic subject specification information of the image registration server 1. Then, the image registration server manager 4 produces a photographic subject list on the image registration server 1.

In the configuration of a photographic subject list 12, pairs of photographic subject specification information 30 registered by the photographic subject registrant 2 and photographic subject identifiers assigned by the image registration server manager 4 to be corresponding to the photographic subject specification information are arranged. The number of the pairs is the number of registered photographic subjects.

A photographic subject list registration part 13 is used by the image registration server manager 4 to input the photographic subject list 12 which is composed of the photographic subject specification information and the photographic subject identifier.

A photographic subject list disclose part 14 is for disclosing the photographic subject list 12 belonging to the image registration server 1 to the applicant and the photographer as a form of a home page through the data communications network 3.

An input part 15 of a photographic subject image application is for receiving an application from the applicant 5 based on a photographic subject identifier used for obtaining an image of a photographic subject which the applicant 5 wants to acquire. In this example, the input part 15 of a photographic subject image application receives a photographic subject identifier which the applicant 5 input using the cellular phone 6 with a display screen via the data communications network 3.

A photograph application collection list 16 is a list where the photographic subject identifiers input from the input part 15 of a photographic subject image application are collected.

A disclose part 17 of photograph application collection list is for disclosing the photograph application collection list 16 to the photographer 7.

A photographic subject image registration part 18 is for receiving a photographic subject image photographed by the photographer 7 using the cellular phone 8 with a digital camera function via the data communications network 3.

A registration image list 20 is a list where photographic subject images registered in the image registration server 1 are collected.

An input part 21 of a distribution image photographic subject identifier is for receiving a designation of the image to be distributed, based on the photographic subject identifier from the applicant 5.

30 denotes photographic subject specification information for specifying a photographic subject, and 31 denotes a photographic subject identifier assigned to a photographic subject. A registration image distribution part 32 distributes a registered photographic subject image to the applicant 5 through the data communications network 3.

Next, a processing flow will be explained. First, the procedure for the photographic subject registrant 2's registering a photographic subject into the image registration server 1 via the data communications network 3 using the personal computer 29 will be described with reference to FIG. 3.

Figure 3:
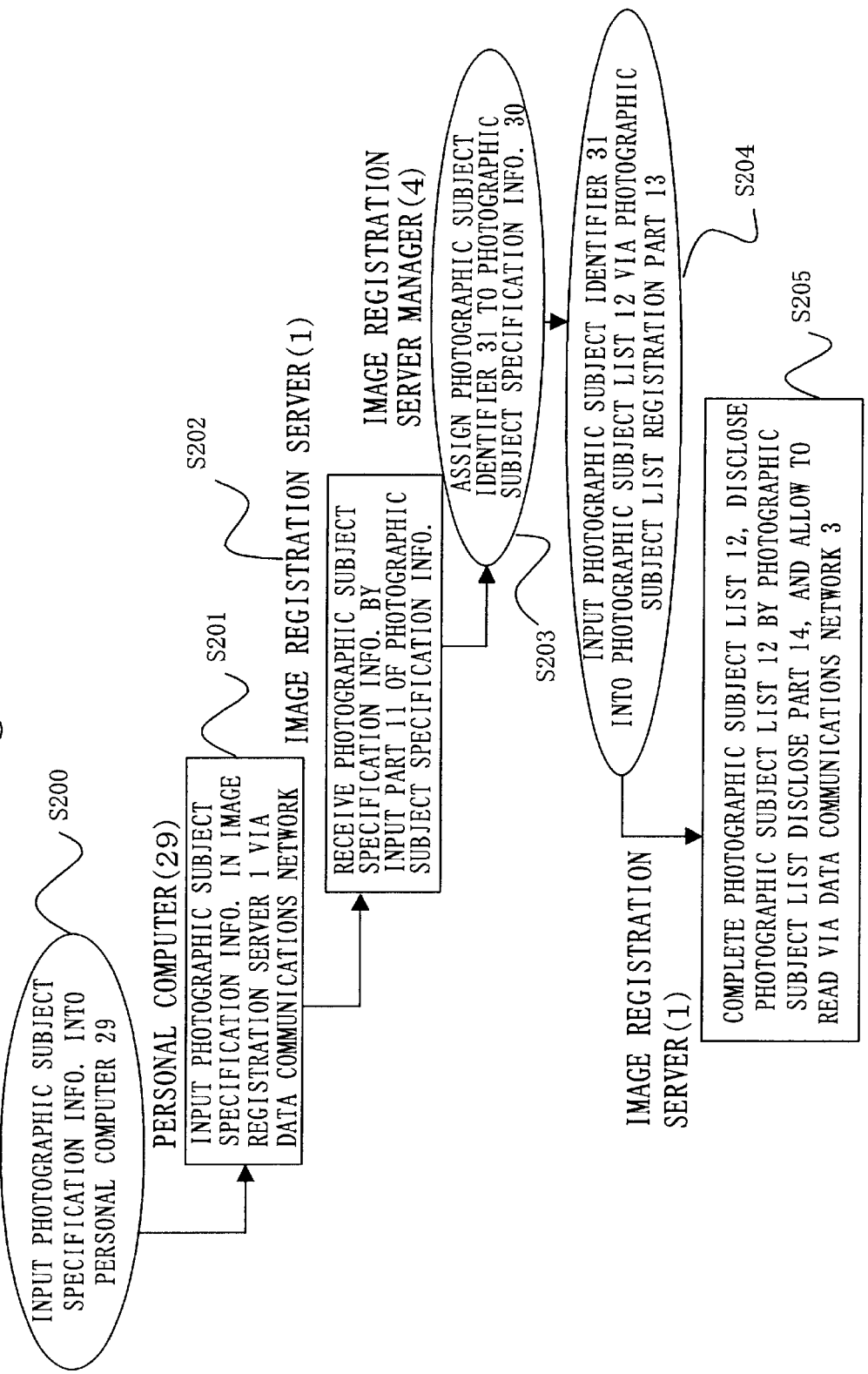
FIG. 3 is a flowchart showing the procedure for registering a photographic subject in the image registration server.

FIG. 3 is a flowchart showing the procedure for registering the photographic subject in the image registration server. The photographic subject registrant 2 inputs information for specifying a photographic subject in the personal computer 29 (S200). When a restaurant management company having a plurality of chain stores uses this system for grasping the situation of each store, (this case is called Embodiment 1-A), photographic subject specification information for specifying the location of a restaurant, a parking lot, each seat, a kitchen, the inside of a refrigerator and so forth is input as the photographic subject specification information. When a gas utility company uses this invention for grasping a construction situation, (this case is called Embodiment 1-B), information for specifying the location of a construction, piping, each construction equipment, a meter and so forth is input.

Such photographic subject specification information 30 is sent to the image registration server 1 through the data communications network 3 (S201). The photographic subject specification information 30 sent to the image registration server 1 is received and registered through the input part 11 of photographic subject specification information (S202).

Then, after checking whether it is possible to specify a photographic subject by using the registered photographic subject specification information 30, the image registration server manager 4 assigns the photographic subject identifier 31 to each photographic subject specification information 30 (S203).

Next, an input is performed into the photographic subject list 12 through the photographic subject list registration part 13 (S204), and the photographic subject list 12 is completed.

Figure 4:
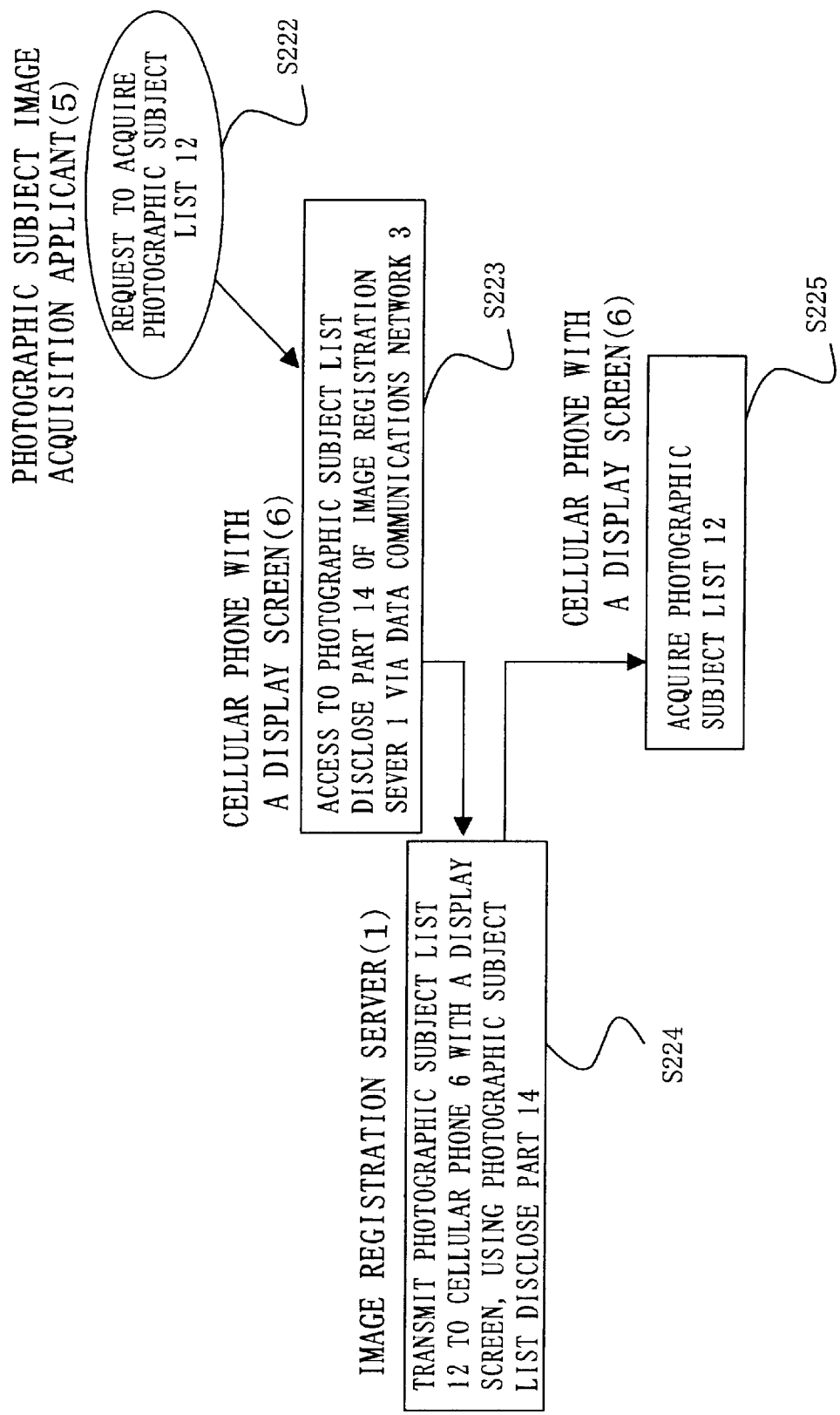
FIG. 4 is a flowchart of acquiring a photographic subject list by an applicant who applies for an acquisition of a photographic subject image.

The created photographic subject list 12 is disclosed to the applicant 5 and the photographer 7 through the photographic subject list disclose part 14 of the image registration server 1. Specifically, the photographic subject list disclose part 14 displays the photographic subject list 12 on the home page of the image registration server 1 (S205). Moreover, the image registration server manager 4 distributes the photographic subject list 12 to the applicant and the photographer in the form of a document if needed. The procedure for the applicant 5's acquiring the photographic subject list 12 disclosed by this photographic subject list disclose part 14 via the data communications network 3 will be explained with reference to FIG. 4. FIG. 4 is a flowchart of receiving a photographic subject list by an applicant who wants to acquire a photographic subject image. First, the applicant 5 requests to acquire the photographic subject list 12 by using portable equipment, such as the cellular phone 6 with a display screen (S222). The cellular phone 6 with a display screen accesses the photographic subject list disclose part 14 via the data communications network 3, and tries to download the photographic subject list 12 shown on the home page of the image registration server 1. In the image registration server 1, when the request of download of the photographic subject list 12 is transmitted through the photographic subject list disclose part 14, the photographic subject list 12 is downloaded to the cellular phone 6 with a display screen (S224). In the cellular phone 6 with a display screen, the downloaded photographic subject list 12 is displayed and the next selection by the applicant 5 is awaited (S225).

Figure 5:
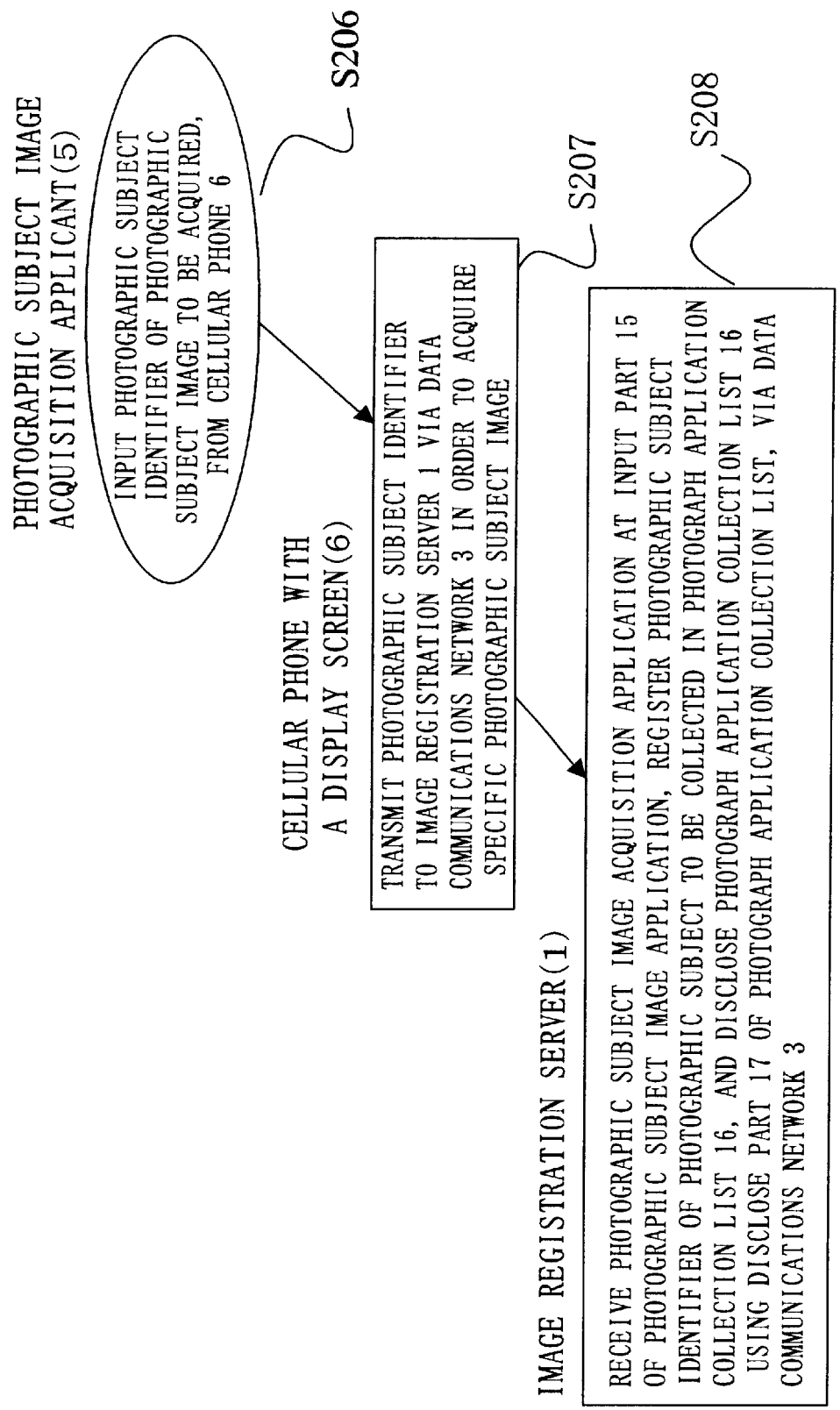
FIG. 5 is a flowchart of applying for an acquisition of a specific photographic subject image.

The procedure for the applicant 5's applying for the input of a specific photographic subject image by will be explained. FIG. 5 is a flowchart of applying for an acquisition of a specific photographic subject image. For example, in Embodiment 1-A, when the administration of the restaurant management company wants to check a situation of visitors in a restaurant and a situation inside the kitchen, the administration notifies the image registration server 1 that the administration wants to receive a specific image of a photographic subject. In Embodiment 1-B, an operator of the management server who is checking a situation of the construction place, as the applicant 5, inputs a photographic subject identifier 31 from the cellular phone 6 with a display screen.

The applicant 5 can know a photographic subject identifier of the photographic subject image which the applicant wants to receive, from the photographic subject list 12 obtained in the previous procedure, and inputs the photographic subject identifier 31 through the cellular phone 6 with a display screen (FIG. 5, S206). The cellular phone 6 with a display screen transmits the input photographic subject identifier 31 to the image registration server 1 via the data communications network 3 (S207). In the image registration server 1 side, this request is transmitted through the input part 15 of a photographic subject image application, and the photographic subject identifier is added to the photograph application collection list 16. The photograph application collection list 16 is disclosed on the home page of the image registration server 1 through the disclose part 17 of photograph application collection list in the same way as above mentioned, and to photograph the photographic subject by the photographer 7 is announced (S208).

Figure 6:
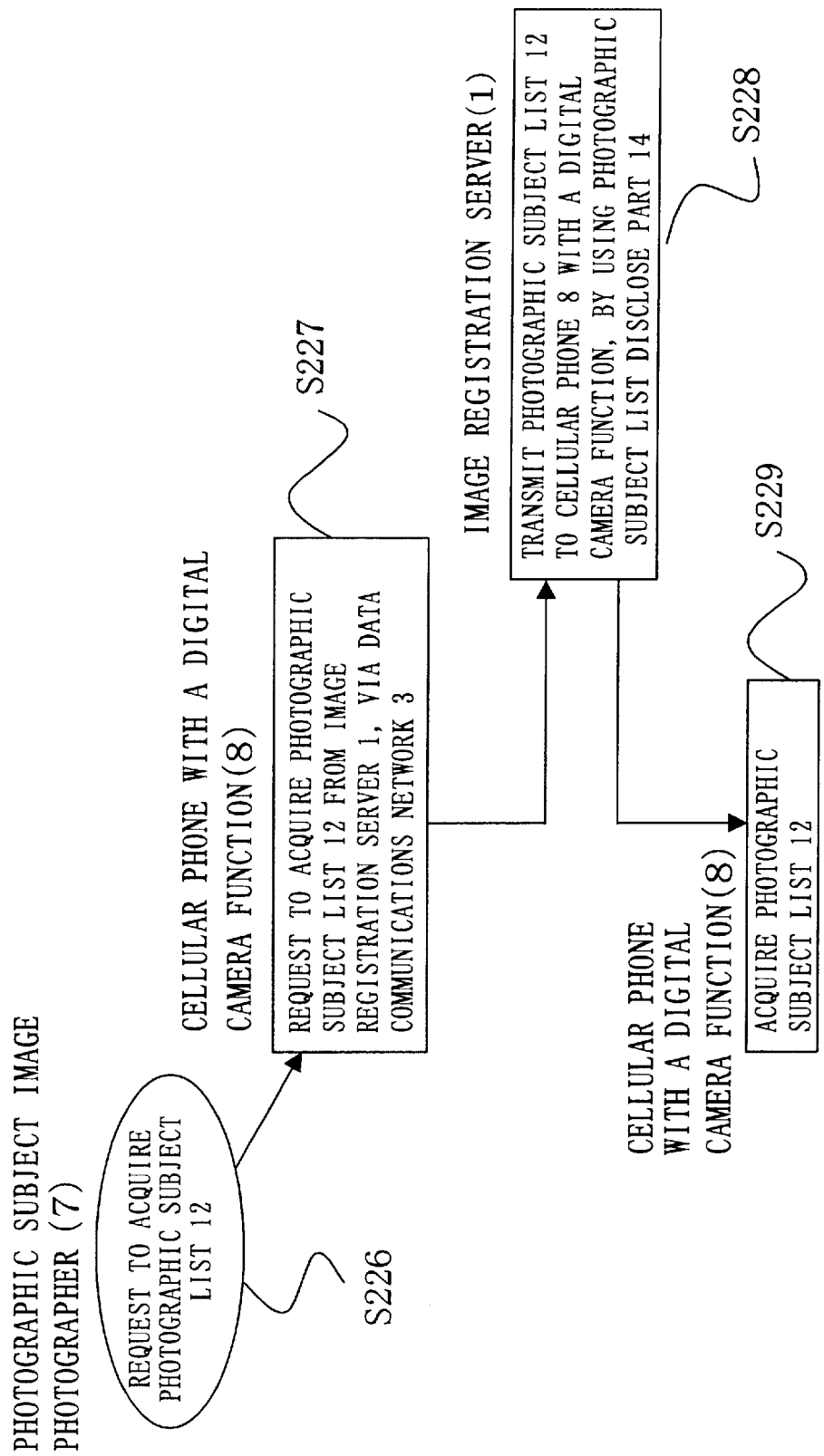
FIG. 6 is a flowchart of acquiring a photographic subject list by a photographic subject image photographer.

Next, the procedure for the photographer 7's acquiring the photographic subject list 12 on the image registration server 1 will now be explained. FIG. 6 is a flowchart of the photographic subject image photographer's acquiring the photographic subject list. By dint of this procedure, the photographer 7 can know which photographic subject is registered in the image registration server 1. The photographic subject image photographer 7 requests to acquire the photographic subject list 12 so that specification of a photographic subject can be promptly performed later at the time of collecting photographs (S226). The cellular phone 8 with a digital camera function requests to acquire the photographic subject list 12 from the image registration server 1 via the data communications network 3 (S227). The image registration server 1 receives this request through the photographic subject list disclose part 14, and discloses the photographic subject list 12 toward the cellular phone 8 with a digital camera function (S228). The cellular phone 8 with a digital camera function receives the photographic subject list 12, and stores it in the cellular phone 8 with a digital camera function. According to a request from the photographer 7, the cellular phone 8 with a digital camera function searches the photographic subject specification information 30 in the photographic subject list 12, using the photographic subject identifier 31 as a reference key.

Figure 7:
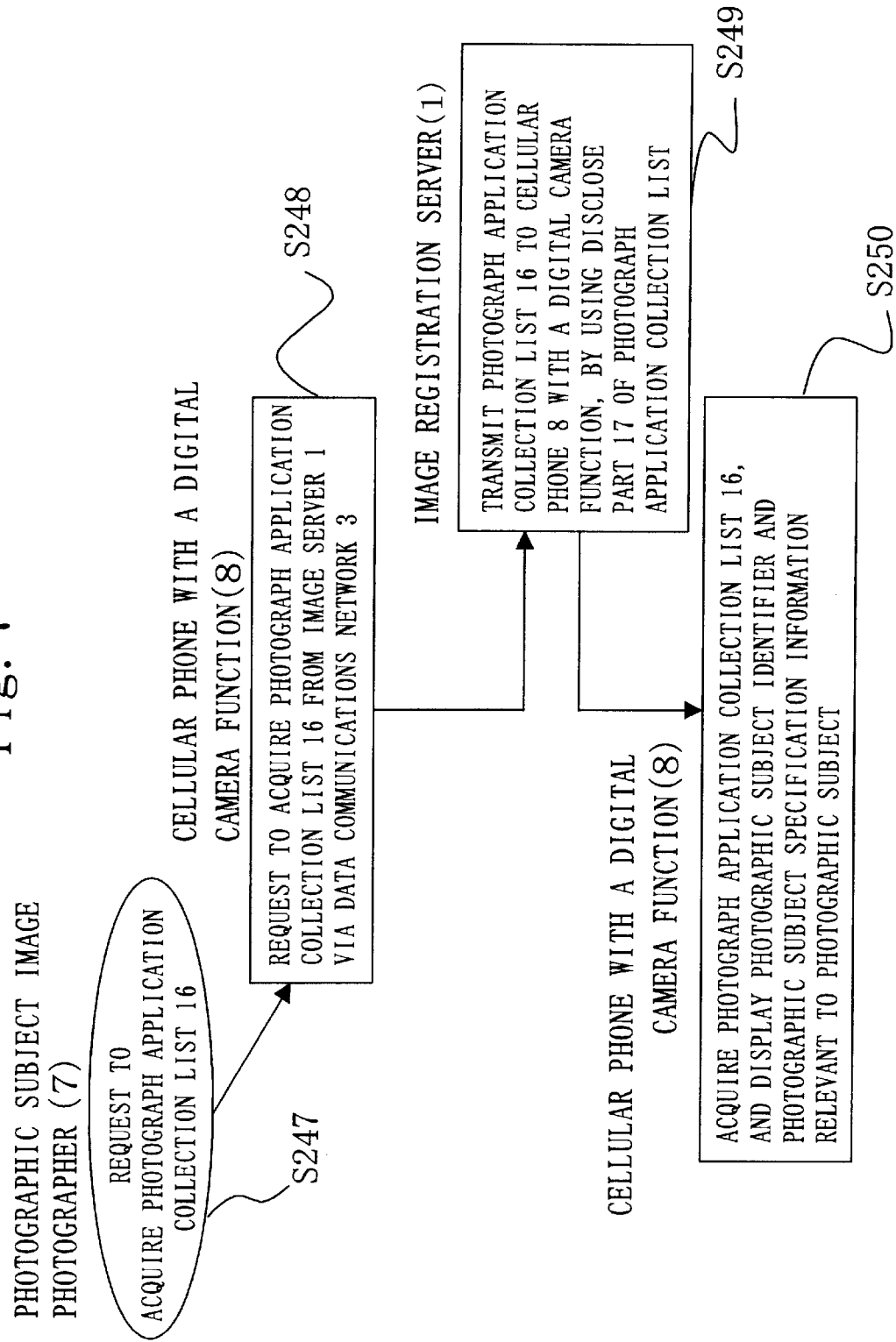
FIG. 7 is a flowchart of acquiring a photograph application collection list by the photographic subject image photographer.

Then, the procedure for the photographer 7's acquiring the photograph application collection list 16 and knowing a photograph of a specific photographic subject is being collected will be explained. FIG. 7 is a flowchart of acquiring the photograph application collection list by the photographic subject image photographer.

The photographer 7 directs the cellular phone 8 with a digital camera function to acquire the photograph application collection list 16 (S247). The photographer 7 can know that a photograph collection of a photographic subject is being performed, based on the photograph application collection list 16. In response to this direction, the cellular phone 8 with a digital camera function begins to communicate with the disclose part 17 of photograph application collection list of the image registration server 1 through the data communications network 3 (S248). Then, using the disclose part 17 of photograph application collection list, the image registration server 1 displays the photograph application collection list 16 on the home page of the image registration server 1 for instance, and goes to the operation of download of the photograph application collection list 16 in response to the request from the cellular phone 8 with a digital camera function (S249).

The cellular phone 8 with a digital camera function receives the photograph application collection list 16, and displays the received photographic subject identifier 31 and the photographic subject specification information 30 relevant to the received photographic subject identifier in the photographic subject list 12 which has been already obtained, on the display screen of the photograph application collection list 16 (S250). By dint of this, information about a photographic subject whose photograph is being collected is shown to the photographic subject image photographer 7.

Figure 8:
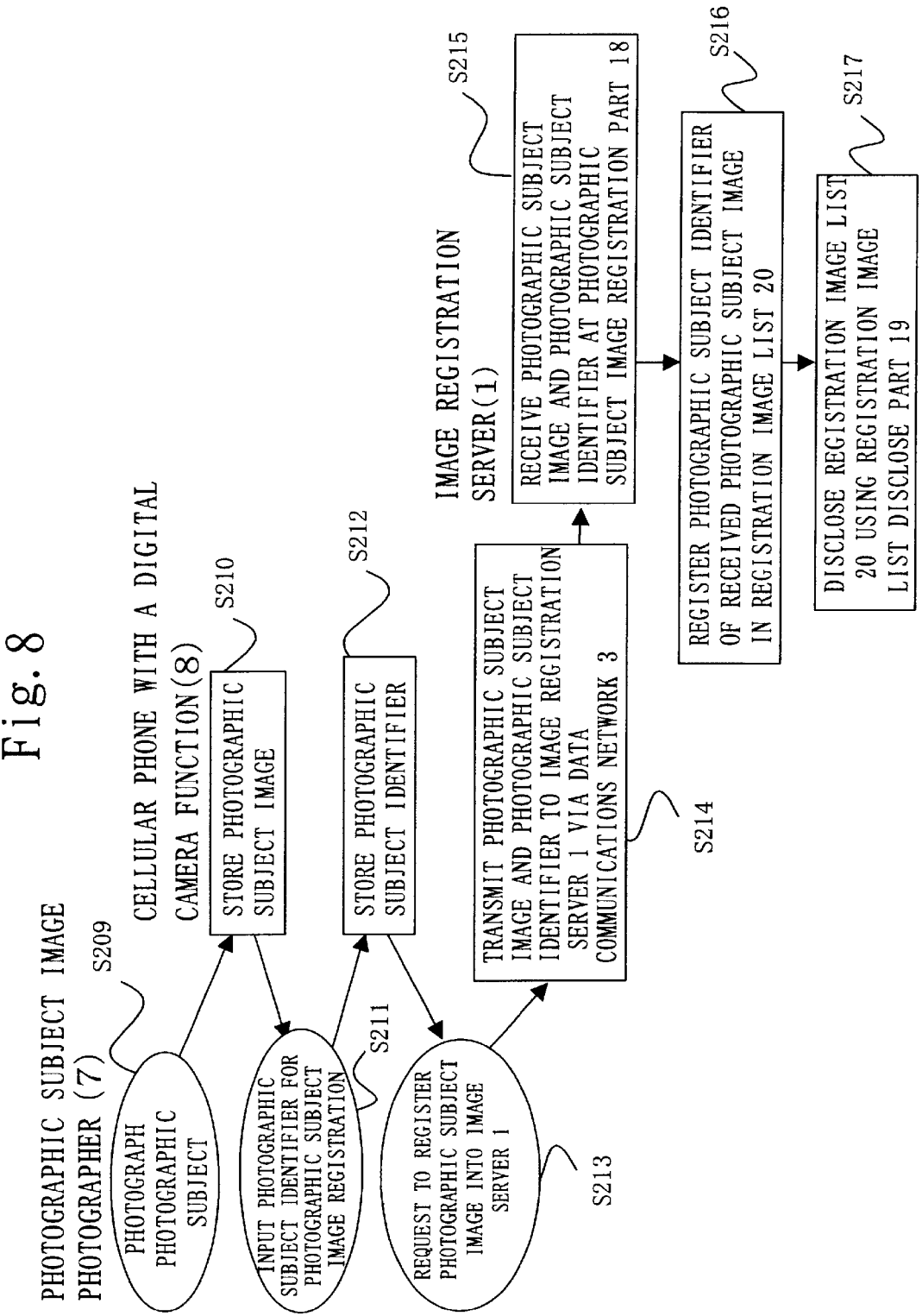
FIG. 8 is a registration flowchart of registering a specific photographic subject image in the image registration server.

Next, the procedures from photographing a photographic subject by the photographer 7 to registering the photographed subject image in the image registration server 1 will be explained. FIG. 8 is a registration flowchart of registering a specific photographic subject image in the image registration server.

The photographer 7 receives the photograph application collection list 16 by the above-mentioned procedure, and specifies the photographic subject whose photograph is being collected, by way of comparing the photograph application collection list 16 with the photographic subject list 12. When possible for the photographer 7 to photograph the photographic subject, the photographer 7 takes a photo of the photographic subject using the cellular phone 8 with a digital camera function (S209), and the photographed photographic subject image is stored in the cellular phone 8 with a digital camera function (S210). The photographer 7 inputs a photographic subject identifier of the photographed subject into the cellular phone 8 with a digital camera function (S211), and the photographic subject identifier is stored in the cellular phone 8 with a digital camera function (S212). Then, the photographer 7 directs the cellular phone 8 with a digital camera function to register the photographic subject image, into the image registration server 1 (S213). The cellular phone 8 with a digital camera function sends the photographic subject image with the photographic subject identifier to the image registration server 1 via: the data communications network 3 (S214). The sent photographic subject image and the photographic subject identifier are received at the photographic subject image registration part 18 in the image registration server 1. The received photographic subject image is stored in the image registration server 1 (S215), and the received photographic subject identifier is added to the registration image list 20 (S216). Furthermore, the registration image list 20 is disclosed via the data communications network 3 using a registration image list disclose part 19 (S217). By these procedures, the applicant 5 is notified that the image of the photographic subject 9 which has been applied was photographed and registered in the image registration server 1.

Figure 9:
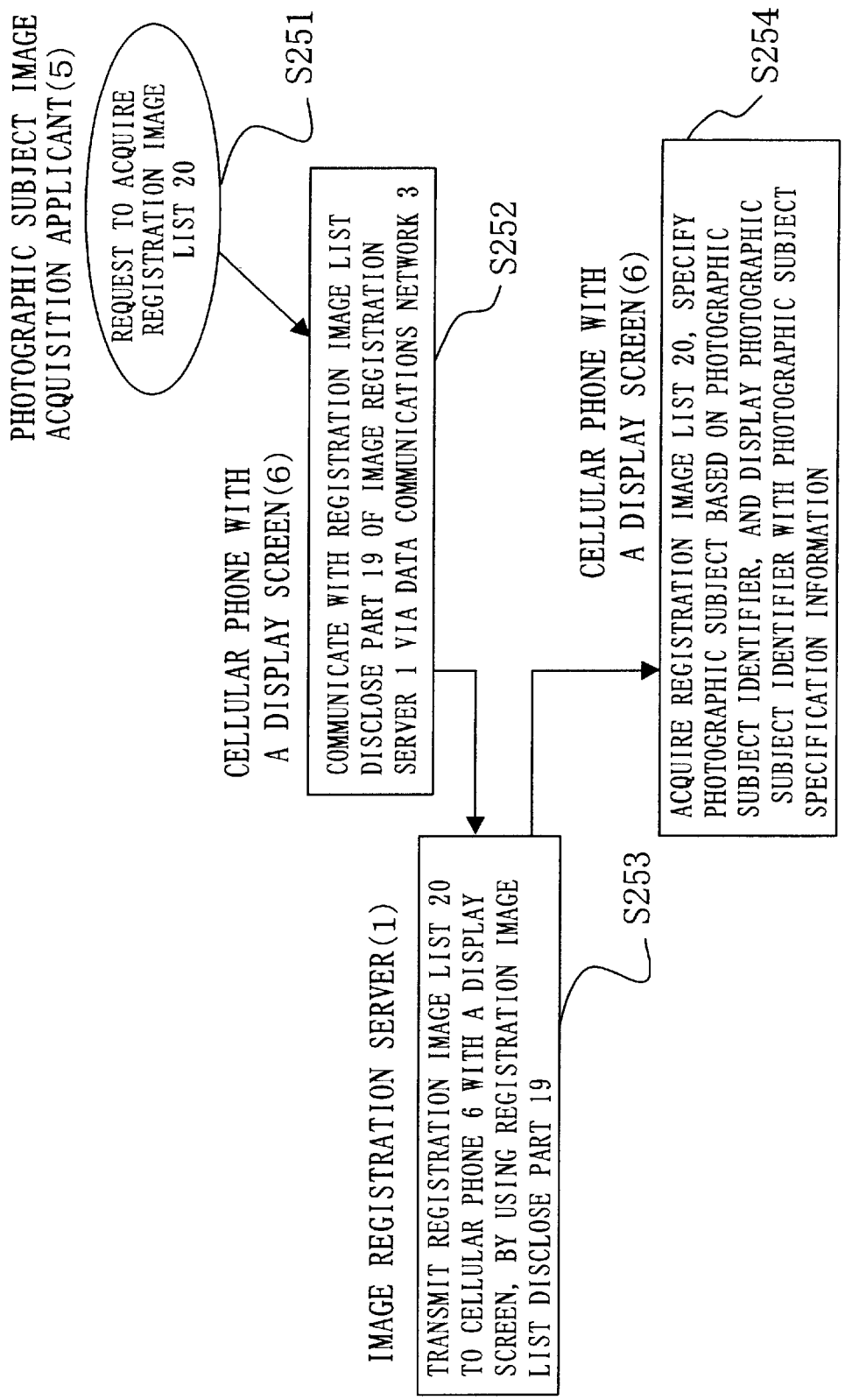
FIG. 9 is a flowchart of acquiring a registration image list by an applicant who applies for an acquisition of a photographic subject image.

Now, the procedure for acquiring the registration image list 20 by the applicant 5 will be explained. FIG. 9 is a flowchart of acquiring the registration image list by an applicant who applies for an acquisition of a photographic subject image. For the purpose of checking whether or not the applied photographic subject image has been sent to the image registration server 1, the applicant 5 requests to acquire the registration image list 20 from the cellular phone 6 with a display screen (S251). The cellular phone 6 with a display screen communicates with the registration image list disclose part 19 through the data communications network 3 (S252). The image registration server 1 discloses the registration image list 20 through the registration image list disclose part 19, and transmits the registration image list 20 to the cellular phone 6 with a display screen on demand of the cellular phone 6 with a display screen (S253). The cellular phone 6 with a display screen which received the registration image list 20 shows the situation to the applicant 5. The cellular phone 6 with a display screen extracts the photographic subject identifier obtained from the registration image list 20 and the photographic subject specification information 30 obtained from the photographic subject list 12 to be corresponding to the photographic subject identifier, and displays the photographic subject identifier and the photographic subject specification information 30 on the display screen (S254). If the image of the photographic subject which the applicant requested is registered in the registration image list 20, the applicant 5 requires to download the photographic subject image from the image registration server 1.

Figure 10:
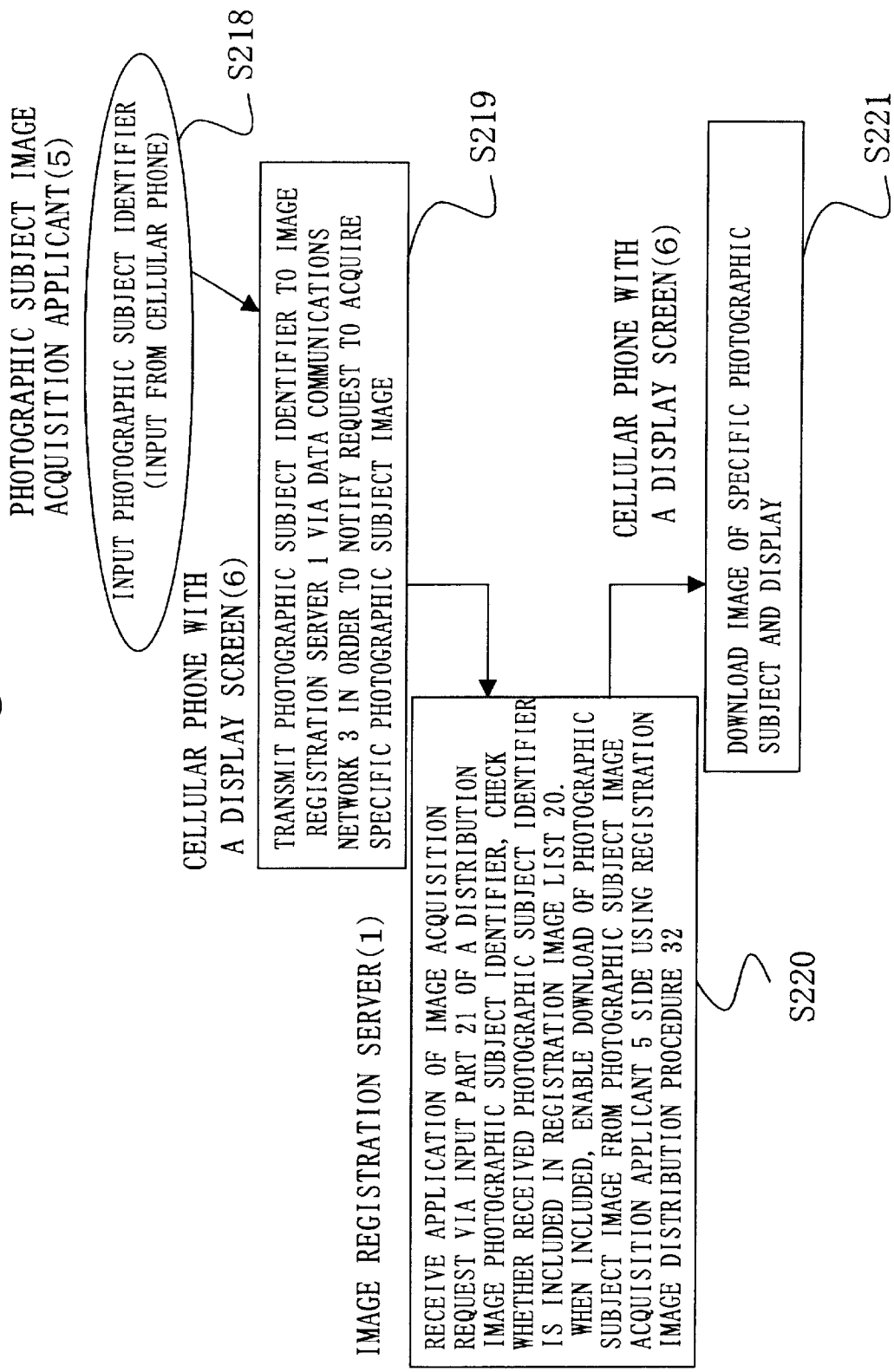
FIG. 10 is a flowchart of acquiring a registration image of a specific photographic subject image from the image registration server.

Next, the procedure for downloading a specific photographic subject image from the image registration server 1 to the cellular phone 6 with a display screen will be explained. FIG. 10 is a flowchart of acquiring a registration image of a specific photographic subject image from the image registration server. The applicant 5 can know whether the image which he applied to acquire is registered or not from the registration image list 20. When registered, the photographic subject identifier is input in order to obtain the photographic subject image (S218). The cellular phone 6 with a display screen notifies the image registration server 1 of the input photographic subject identifier via the data communications network 3 (S219). After receiving the photographic subject identifier of he photographic subject image and an acquisition request for the photographic subject image via the input part 21 of a distribution image photographic subject identifier, the image registration server 1 checks whether or not the photographic subject image exists in the registration image list 20. The image registration server 1 enables the download of a specified photographic subject image to the cellular phone 6 with a display screen, by using the registration image distribution part 32 (S220). In the cellular phone 6 with a display screen, the downloaded photographic subject image is displayed on the display screen (S221).

According to the above procedures, the applicant 5 can have an image of a desired photographic subject photographed by the photographer 7 and can receive distribution of the photographed photographic subject image, through the image registration server 1 and the data communications network 3.

In these procedures, the photographic subject identifier 31 is used for the method of the applicant 5's specifying the photographic subject whose image the applicant wants to acquire, with respect to the image registration server 1. Furthermore, the photographic subject identifier 31 is used for specifying a photographic subject which the photographer 7 is requested to photograph and used for clarifying which image belongs to which photographic subject when photographed subject image is being registered in the image registration server 1. Moreover, the photographic subject identifier 31 is used for searching a photographic subject image to be downloaded by the applicant 5 from the image registration server 1. By dint of this, a simplified processing and an electronic processing of the intermediary distribution operation of the photographic subject image through the image registration server 1 and the data communications network 3 can be realized.

Embodiment 2.

Figure 11:
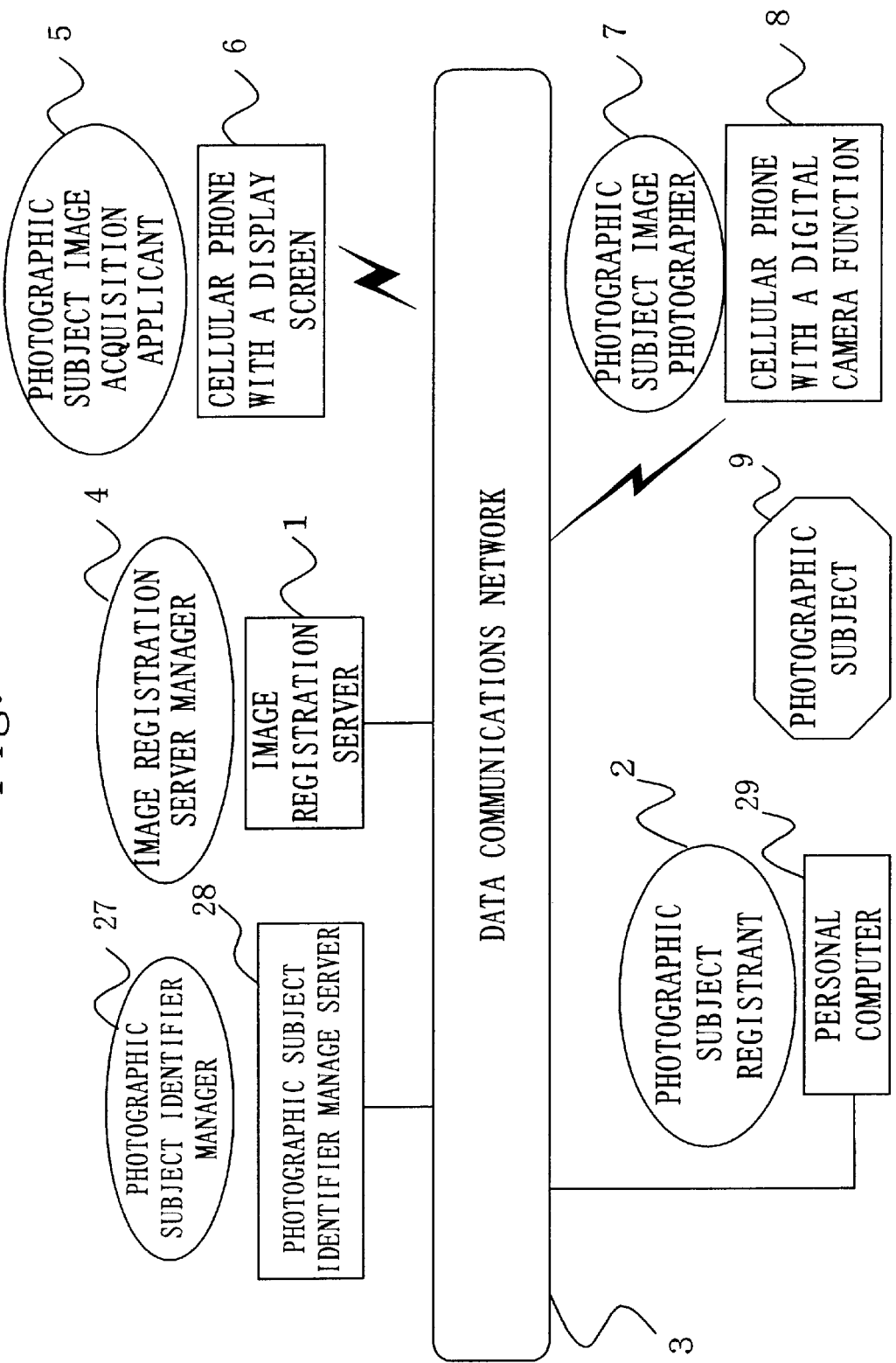
FIG. 11 shows a configuration of a photographic subject image intermediary distribution system according to Embodiment 2.

FIG. 11 shows a configuration of a photographic subject image intermediary distribution system according to Embodiment 2. This system is a photographic subject list open display type in which a photographic subject identifier manage server assigns a photographic subject identifier.

In FIG. 11, the following are the same configuration elements as those in FIG. 1: the image registration server 1, the photographic subject registrant 2, the data communications network 3, the image registration server manager 4, the photographic subject image acquisition applicant 5, the cellular phone 6 with a display screen, the photographic subject image photographer 7, the cellular phone 8 with a digital camera function, and the photographic subject 9. However, the configuration elements inside the image registration server 1 differ from those of FIG. 1. 28 denotes a photographic subject identifier manage server, connected to the data communications network 3, which manages a photographic subject list to be open to the public. 27 denotes a photographic subject identifier manager which manages the photographic subject identifier manage server.

Figure 12:
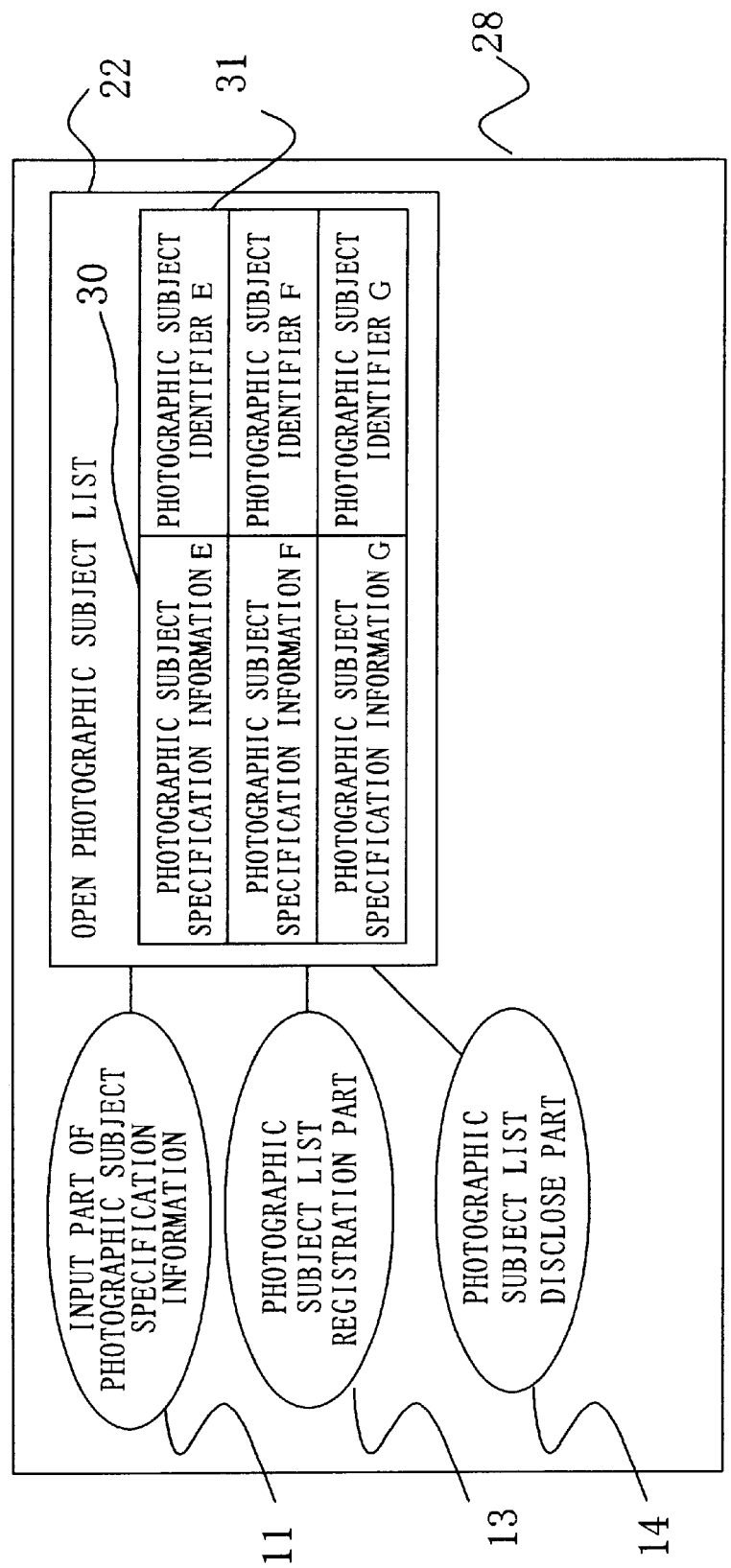
FIG. 12 shows a configuration of a photographic subject identifier manage server according to Embodiment 2.

FIG. 12 shows a configuration of the photographic subject identifier manage server 28 according to Embodiment 2. The input part 11 of photographic subject specification information, the photographic subject list registration part 13, and the photographic subject list disclose part 14 are the same elements as those included in the image registration server 1 of FIG. 2. 22 denotes an open photographic subject list, and the photographic subject specification information 30 and the photographic subject identifier 31 which are included in the open photographic subject list 22 are the same elements as those included in the photographic subject list 12 in the image registration server 1 of FIG. 2. However, the photographic subject specification information 30 and photographic subject identifier 31 registered in the open photographic subject list 22 are open to the public through the photographic subject list disclose part 14 without being limited, which differs from the case of the image registration server photographic subject list 12 shown in FIG. 2.

Figure 13:
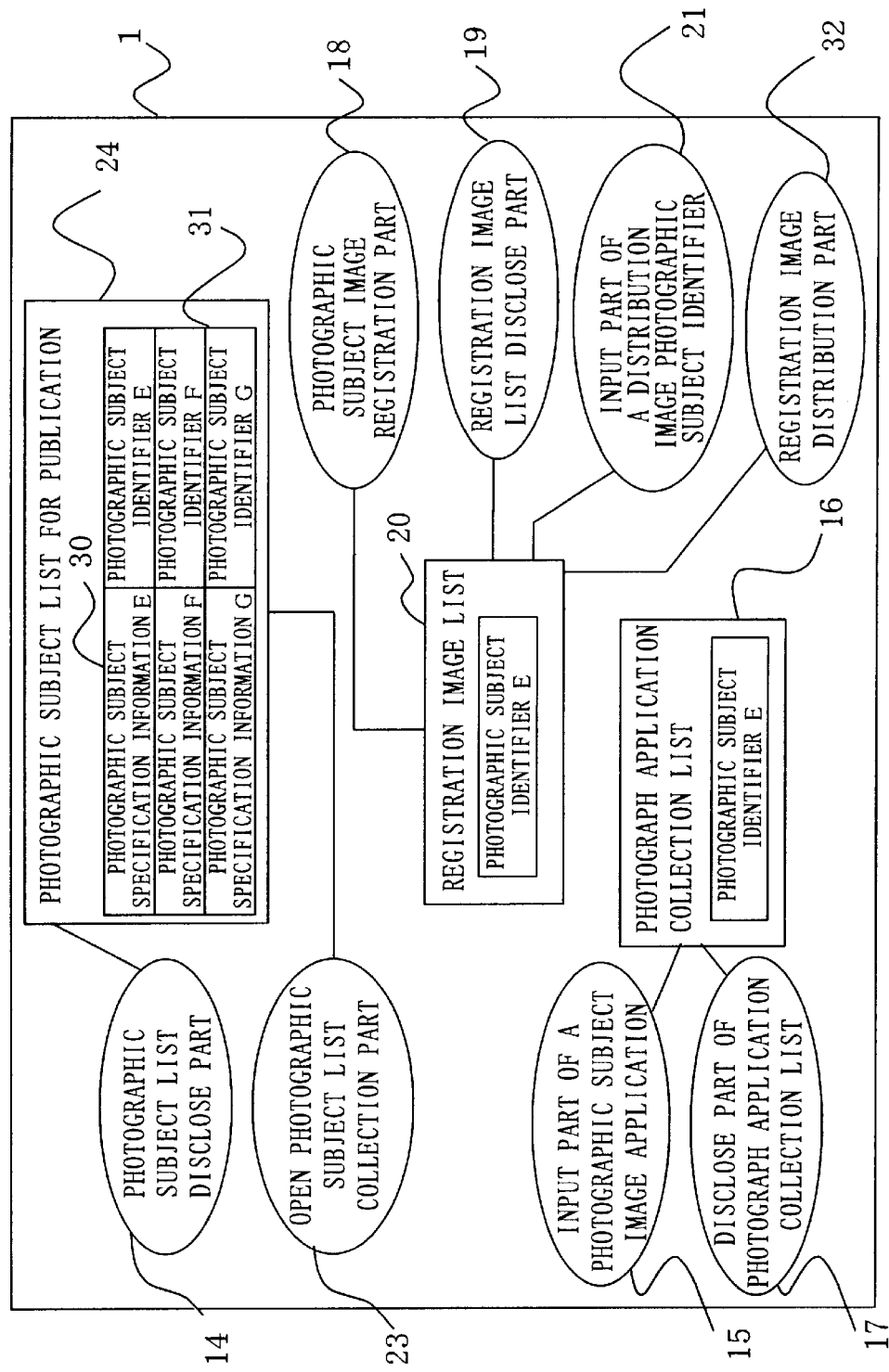
FIG. 13 shows a configuration of a photographic subject identifier manage server according to Embodiment 2.

FIG. 13 shows a configuration of the photographic subject identifier manage server according to Embodiment 2. The photographic subject list disclose part 14, the input part 15 of a photographic subject image application, the photograph application collection list 16, the disclose part 17 of photograph application collection list, the photographic subject image registration part 18, the registration image list disclose part 19, the registration image list 20, and the input part 21 of a distribution image photographic subject identifier are the same elements as those included in the image registration server 1 of FIG. 2. An open photographic subject list collection part 23 collects the open photographic subject list 22 from the photographic subject identifier manage server 28. A photographic subject list 24 for publication is composed of a part of the open photographic subject list 22 which the image registration server 1 received from the photographic subject identifier manage server 28, and the photographic subject list 24 for publication relates to photographic subjects whose photographic subject identifiers have been open to the public. 32 denotes the same element as that having the same number shown in FIG. 2.

First, the procedure for the photographic subject registrant 2's registering a photographic subject into the photographic subject identifier manage server 28 via the data communications network 3 using the personal computer 29 will be explained.

Figure 14:
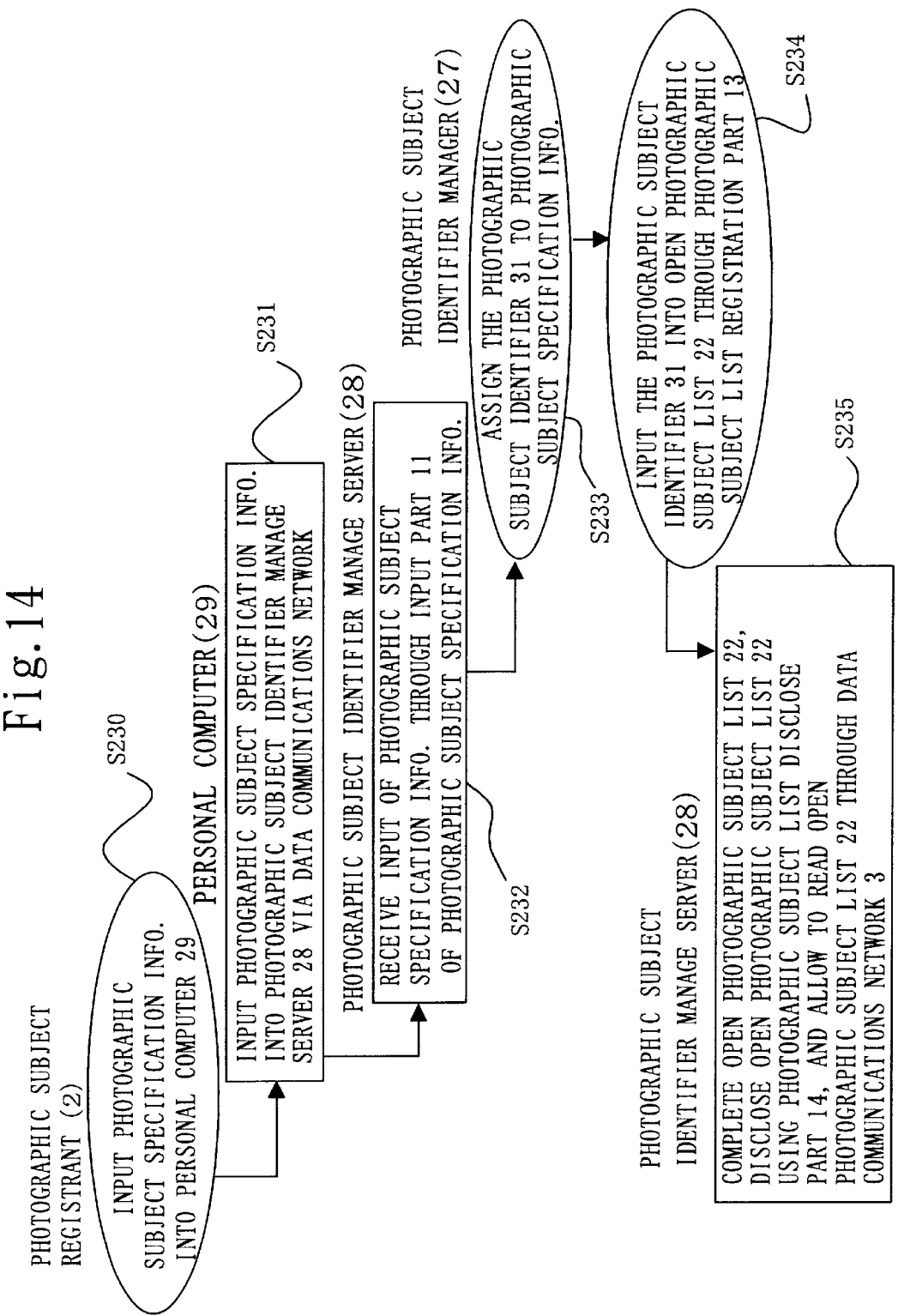
FIG. 14 is a flowchart of registering a photographic subject in a photographic subject identifier manage server.

FIG. 14 is a flowchart of registering the photographic subject in the photographic subject identifier manage server. When the photographic subject registrant 2 wants to give a photographic subject identifier having been disclosed to a certain photographic subject, the photographic subject registrant 2 inputs photographic subject specification information using the personal computer 29 (S230). The personal computer 29 applies for registration of a photographic subject to the photographic subject identifier manage server 28 via the data communications network 3 (S231). As an example of the photographic subject registrant 2, staffs of the public institutions (for example, the police, a firefighting office, etc.) who have the necessity of promptly knowing the situation of the accident and the calamity spot can be cited. It is intended to specify and register the photographic subject concerning the accident and the calamity and to obtain an image of the photographic subject (this case is called Embodiment 2-A). It is also intended when a shop owner wants to advertise his commodities by having many and unspecified men look at them arranged in his own store, he registers a showcase of the store as a photographic subject (this case is called Embodiment 2-B). In each case, specification of the place of the accident and the calamity spot, specification of the object, specification of the address or name of the store, specification of the showcase, etc. can be the photographic subject specification information 30.

The photographic subject identifier manage server 28 receives this photographic subject specification information through the input part 11 of photographic subject specification information, and stores it in the open photographic subject list 22 (S232). Then, the photographic subject identifier manager 27 judges whether the photographic subject identifier to be open can be assigned to this photographic subject or not, based on the photographic subject specification information. If judged it is acceptable to assign, (S233), the photographic subject identifier 31 is input by using the photographic subject list registration part 13, and the open photographic subject list 22 is completed (S234). After the open photographic subject list 22 is completed, the photographic subject identifier manage server 28 discloses the open photographic subject list 22 to the public through the data communications network 3 using the photographic subject list disclose part 14 (S235).

If it is judged assigning the photographic subject identifier to be open is not appropriate in S233 at the above procedure, photographic subject identifier 31 is not assigned to the photographic subject specification information 30.

For example, as for a photographic subject registration aiming at information acquisition of the accident and the calamity spot by men other than a specific public institution pursuer, or a photographic subject registration aiming at the showcase photography of a specific store to which the shopkeeper has not given consent, a photographic subject identifier to be open may not be assigned.

Next, the procedure for the image registration server 1's reading a part of the open photographic subject list 22 from the photographic subject identifier manage server 28, and creating the photographic subject list 24 for publication will be explained.

Figure 15:
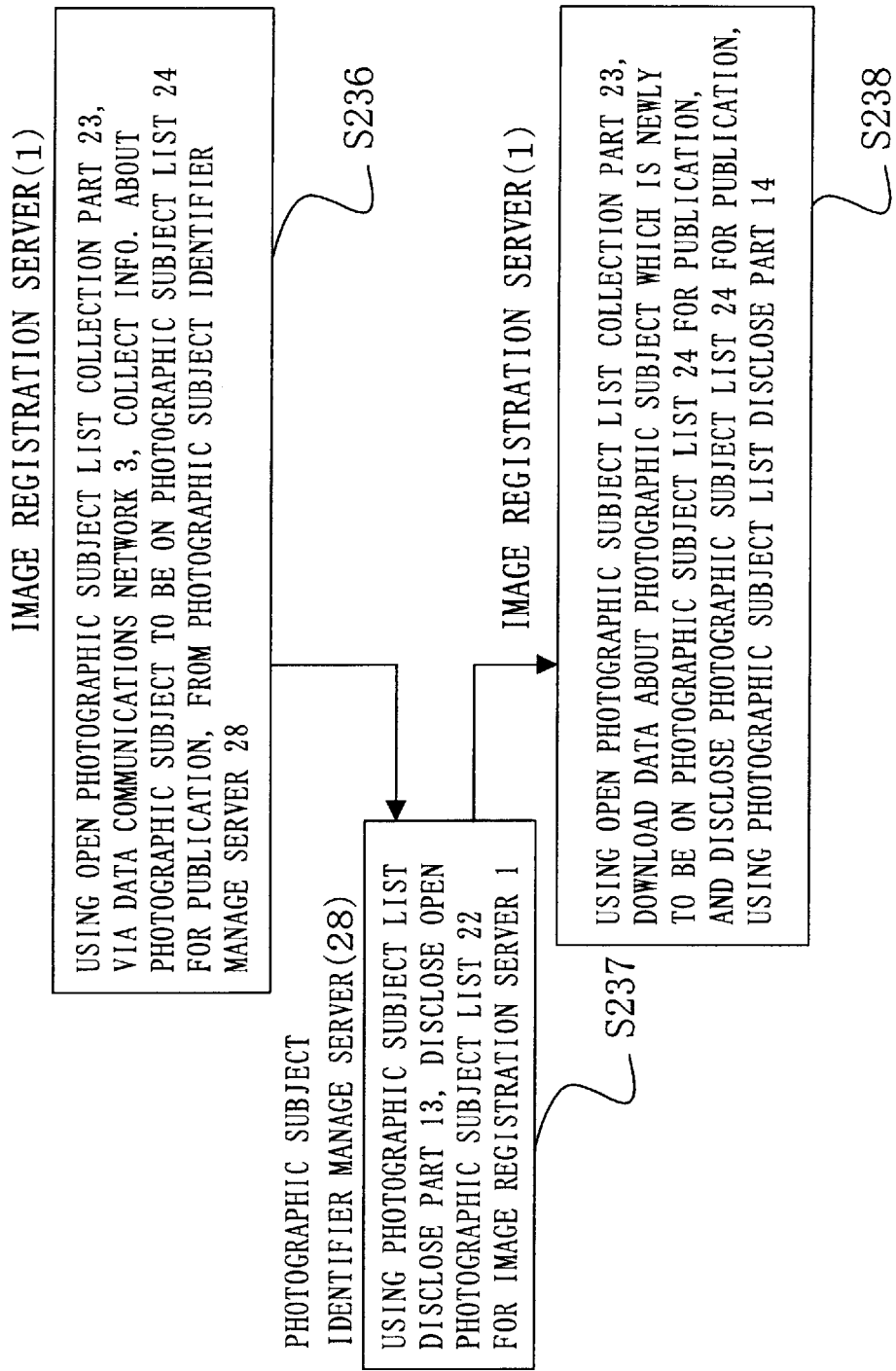
FIG. 15 is a flowchart of acquiring list information from the photographic subject identifier manage server by an image registration server.

FIG. 15 is a flowchart of acquiring list information from the photographic subject identifier manage server by the image registration server. Via the data communications network 3, the image registration server 1 which can be communicated with the photographic subject identifier manage server 28 reads the open photographic subject list 22 disclosed on the photographic subject identifier manage server 28 by using the open photographic subject list collection part 23 (S236). The photographic subject identifier manage server 28 discloses the open photographic subject list 22 through the photographic subject list disclose part 14, and gives the photographic subject specification information 30 and the photographic subject identifier 31 of the open photographic subject list 22 to the image registration server 1 responsive to the demand of the image registration server 1 (S237). The image registration server 1 obtains the photographic subject specification information 30 and the photographic subject identifier 31 about the photographic subject which the image registration server 1 needs, from the open photographic subject list 22 using the open photographic subject list collection part 23, and creates the photographic subject list 24 for publication. Furthermore, the photographic subject list 24 for publication is disclosed to the public through the data communications network 3 using the photographic subject list disclose part 14 on the image registration server 1 (S238). At this time, the image registration server manager 4 selects the photographic subject to be displayed on the photographic subject list 24 for publication.

Figure 16:
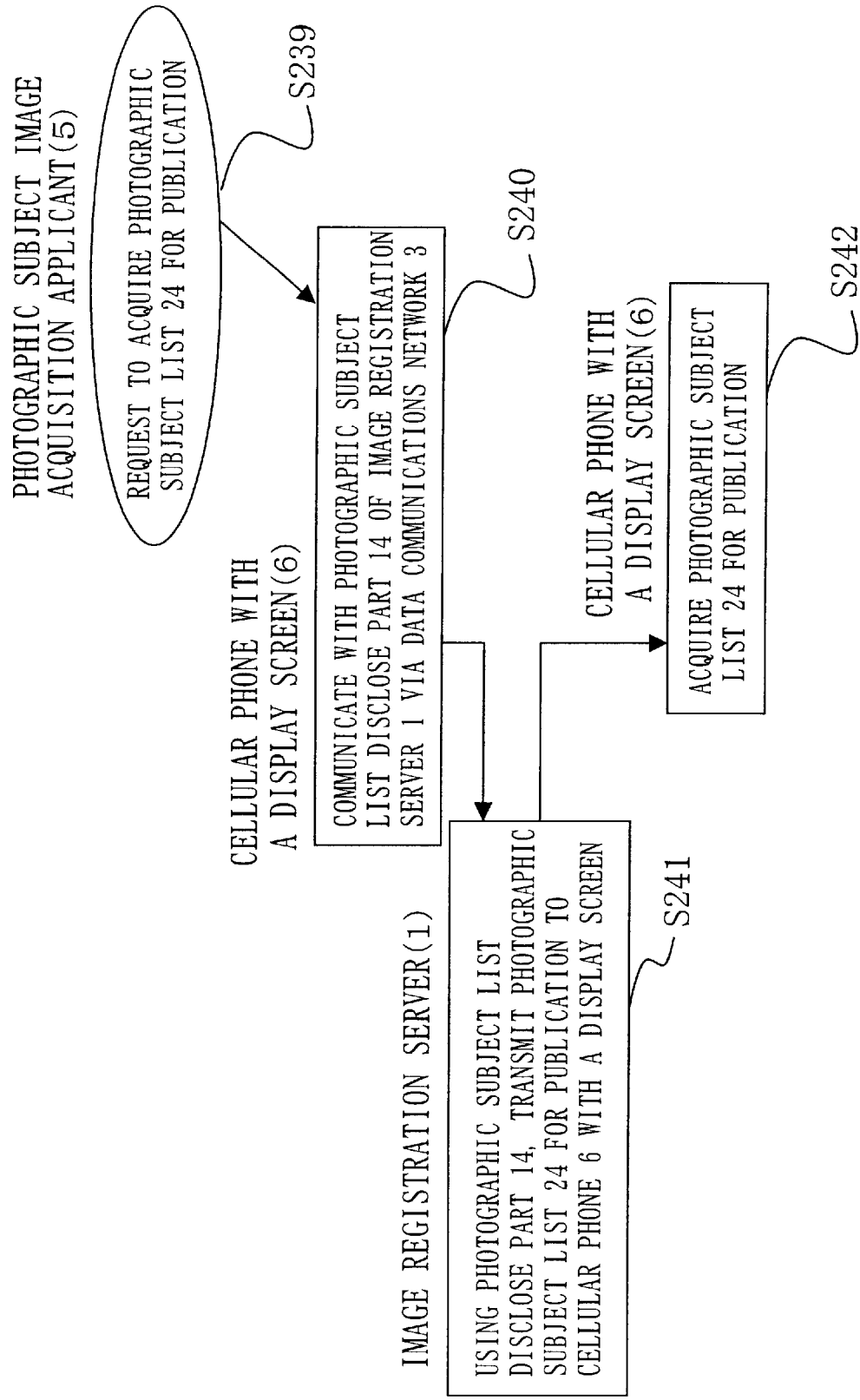
FIG. 16 is a flowchart of acquiring a photographic subject list for publication by an applicant who applies for an acquisition of a photographic subject image.

Then, the procedure for the applicant 5's acquiring the photographic subject list 24 for publication on the image registration server 1 via the data communications network 3 will be explained. FIG. 16 is a flowchart of acquiring the photographic subject list for publication by a photographic subject image acquisition applicant.

The applicant 5 requests to acquire the photographic subject list 24 for publication, by using portable equipment, such as the cellular phone 6 with a display screen (S239). The cellular phone 6 with a display screen accesses the photographic subject list disclose part 14 via the data communications network 3, and tries to read the photographic subject list 24 for publication displayed on the home page of the image registration server 1 (S240). In the image registration server 1, when the request for reading the photographic subject list 24 for publication is transmitted through the photographic subject list disclose part 14, the whole or a part, if needed, of the photographic subject list 24 for publication is transmitted to the cellular phone 6 with a display screen (S241). In the cellular phone 6 with a display screen, the read photographic subject list 24 for publication is displayed, and the next selection from the applicant 5 is awaited (S242).

The operation of the image registration server 1 after this step is the same as that of FIG. 5. Namely, in the case of Embodiment 2-A, the specific public institution pursuer who has registered the photographic subject becomes the applicant 5 and inputs the photographic subject identifier 31 of the photographic subject 9 from the cellular phone 6 with a display screen (S206). The input photographic subject identifier 31 is added to the photograph application collection list 16 through the input part 15 of a photographic subject image application of the image registration server 1 via the data communications network 3 (S207). This photograph application collection list 16 is disclosed on the home page of the image registration server 1 through the disclose part 17 of photograph application collection list. Thereby, to photograph the photographic subject by the photographer 7 is announced (S208).

Figure 17:
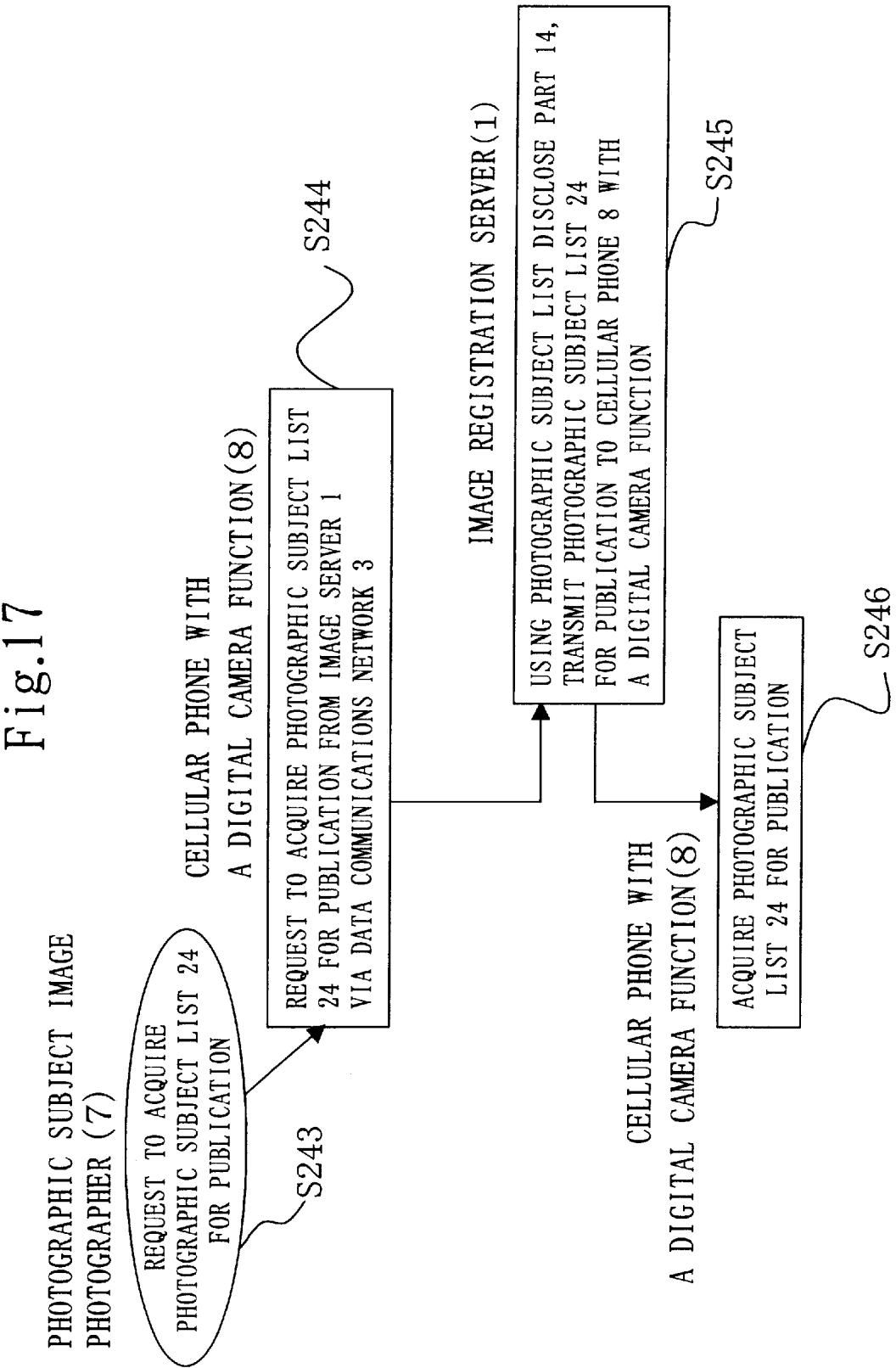
FIG. 17 is a flowchart of acquiring the photographic subject list for publication by a photographic subject image photographer.

Next, the procedure for the photographer 7's acquiring the photographic subject list 24 for publication on the image registration server 1 will now be explained. FIG. 17 is a flowchart of acquiring the photographic subject list for publication by the photographic subject image photographer. By dint of this procedure, the photographer 7 can know which photographic subject is registered in the image registration server 1. The photographic subject image photographer 7 requests to acquire the photographic subject list 24 for publication so that specifying a photographic subject can be promptly performed later at the time of collecting photographs (S243). The cellular phone 8 with a digital camera function requests to acquire the photographic subject list 24 for publication from the image registration server 1 via the data communications network 3 (S244). The image registration server 1 receives this request through the photographic subject list disclose part 14, and discloses the photographic subject list 24 for publication toward the cellular phone 8 with a digital camera function (S245). The cellular phone 8 with a digital camera function receives the photographic subject list 24 for publication, and stores it in the cellular phone 8 with a digital camera function. According to the request from the photographer 7, the photographic subject list 24 for publication is utilized when the photographic subject specification information 30 is searched using the photographic subject identifier 31 as a reference key.

The procedure by which the photographer 7 knows that a photograph of a specific photographic subject is being collected based on the photograph application collection list 16 is the same as that of FIG. 7.

Then, the procedures for the photographer 7 who has known a photographic subject whose photograph is being collected, taking a photograph of the photographic subject, sending the photographic subject image and the photographic subject identifier to the image registration server 1, and registering the photographic subject identifier of the photographed photographic subject in the registration image list 20 are the same as those of FIG. 8 (from S209 to S217).

Furthermore, the procedures for the applicant 5's acquiring the registration image list 20 through the cellular phone 6 with a display screen (from S251 to S254), and consequently the applicant 5's downloading the photographic subject image from the image registration server 1 when it is found that the photographic subject image which the applicant applied for acquiring is registered in the image registration server 1 (from S218 to S221) are the same as those of FIG. 9 and FIG. 10 respectively.

In this way, the specific public institution pursuer being the applicant 5 can receive the photographic subject image for which the applicant applied, at the cellular phone 6 with a display screen, and can display the received photographic subject image on the display screen.

In the case of Embodiment 2-B, the shopkeeper who has performed registration corresponds to the photographer 7. The shopkeeper acquires the photographic subject list 24 for publication in order to check that the photographic subject identifier 31 of his store is displayed on the photographic subject list 24 for publication of the image registration servers 1 and to check if it is possible to register the photographic subject 9 (from S243 to S246). Then, the shopkeeper who has checked that the photographic subject identifier 31 has been assigned to the showcase of his store and it is possible to register the photographic subject image in the image registration server 1 becomes the photographer 7. Then, the shopkeeper being the photographer 7 photographs the showcase of the store which is the photographic subject 9 using the cellular phone 8 with a digital camera function, and registers the photographic subject image in the image registration server 1 using a photographic subject identifier (from S209 to S217). Thereby, the photographic subject image is stored in the image registration server 1 through the photographic subject image registration part 18, and the photographic subject identifier is added to the registration image list 20. The registration image list 20 is disclosed by the registration image list disclose part 19.

On the other hand, the applicant 5 acquires the photographic subject list 24 for publication of the image registration servers 1 as shown in FIG. 16 (from S239 to S242), and checks whether the photographic subject image which the applicant wants to acquire corresponds to the photographic subject identifier 31 disclosed publicly. This procedure is skipped if the photographic subject identifier of the photographic subject image which the applicant wants to acquire has already been known.

The procedure for downloading a specific photographic subject image from the image registration server 1 to the cellular phone 6 with a display screen is the same as that of FIG. 10. In this procedure, the photographic subject identifier 31 is used for the method of the applicant 5's specifying the photographic subject whose image the applicant 5 wants to acquire, with respect to the image registration server 1. In Embodiment 2-A, the photographic subject identifier 31 is used for specifying the photographic subject which the photographer 7 is requested to photograph. Furthermore, in both the cases of Embodiment 2-A and 2-B, the photographic subject identifier 31 is used for clarifying which image belongs to which photographic subject when photographed subject image is being registered in the image registration server 1. Moreover, the photographic subject identifier 31 is used for specifying a photographic subject image to be downloaded by the applicant 5 from the image registration server 1. By dint of this, a simplified processing and an electronic processing of the intermediary distribution operation of the photographic subject image through the image registration server 1 and the data communications network 3 can be realized.

Embodiment 3.

In this Embodiment, the photographic subject identifier is composed only of the numbers from 0 to 9 and the signs * and # assigned to the dial buttons of a cellular phone. For instance, the photographic subject identifier "01#427453" is assigned to the photographic subject of "a show window of a certain store" and the photographic subject identifier "15#520594" is assigned to the photographic subject of "a specific car which a certain man owns".

The processing flow is the same as that of Embodiment 1. Since the photographic subject identifier is composed as mentioned above, the applicant 5 can input the photographic subject identifier by just selecting and pressing the dial button of the cellular phone 6 with a display screen (S206 of FIG. 5, and S218 of FIG. 10). For, example, the buttons "01#427453" are pushed down.

Moreover, in the case of Embodiment 2, if the photographic subject identifiers which have been open to the public are composed only of the numbers from 0 to 9 and the signs * and # assigned to the dial buttons of the cellular phone, the acquisition application of a photographic subject image can be performed by the same procedure.

Embodiment 4.

In this Embodiment, the photographic subject identifier is also composed only of the numbers from 0 to 9 and the signs * and # assigned to the dial buttons of a cellular phone. The photographic subject identifier "01#427453" is assigned to the photographic subject of "a show window of a certain store".

The processing flow is the same as that of Embodiment 1. Since the photographic subject identifier is composed only of the numbers from 0 to 9 and the signs * and # assigned to the dial buttons of a cellular phone, the photographer 7 can register a photographic subject image into the image registration sever 1 by just selecting and pressing the dial button of the cellular phone (S211 of FIG. 8).

Moreover, in the case of Embodiment 2, if the photographic subject identifiers which have been open to the public are composed only of the numbers from 0 to 9 and the signs * and # assigned to the dial buttons of the cellular phone, the registration of a photographed subject image into the image registration server 1 can be simply performed by the same procedure.

Embodiment 5.

In this Embodiment, the photographic subject identifier is composed only of the alphabets, the numbers from 0 to 9 and the signs * and # assigned to the dial buttons of a cellular phone, and the pause marks of the alphabet. Other respects are the same as those in Embodiment 3.

Embodiment 6.

In this Embodiment, the photographic subject identifier is composed only of the alphabets, the numbers from 0 to 9 and the signs * and # assigned to the dial buttons of a cellular phone, and the pause marks of the alphabet. Other respects are the same as those in Embodiment 4.

Embodiment 7

Figure 18:
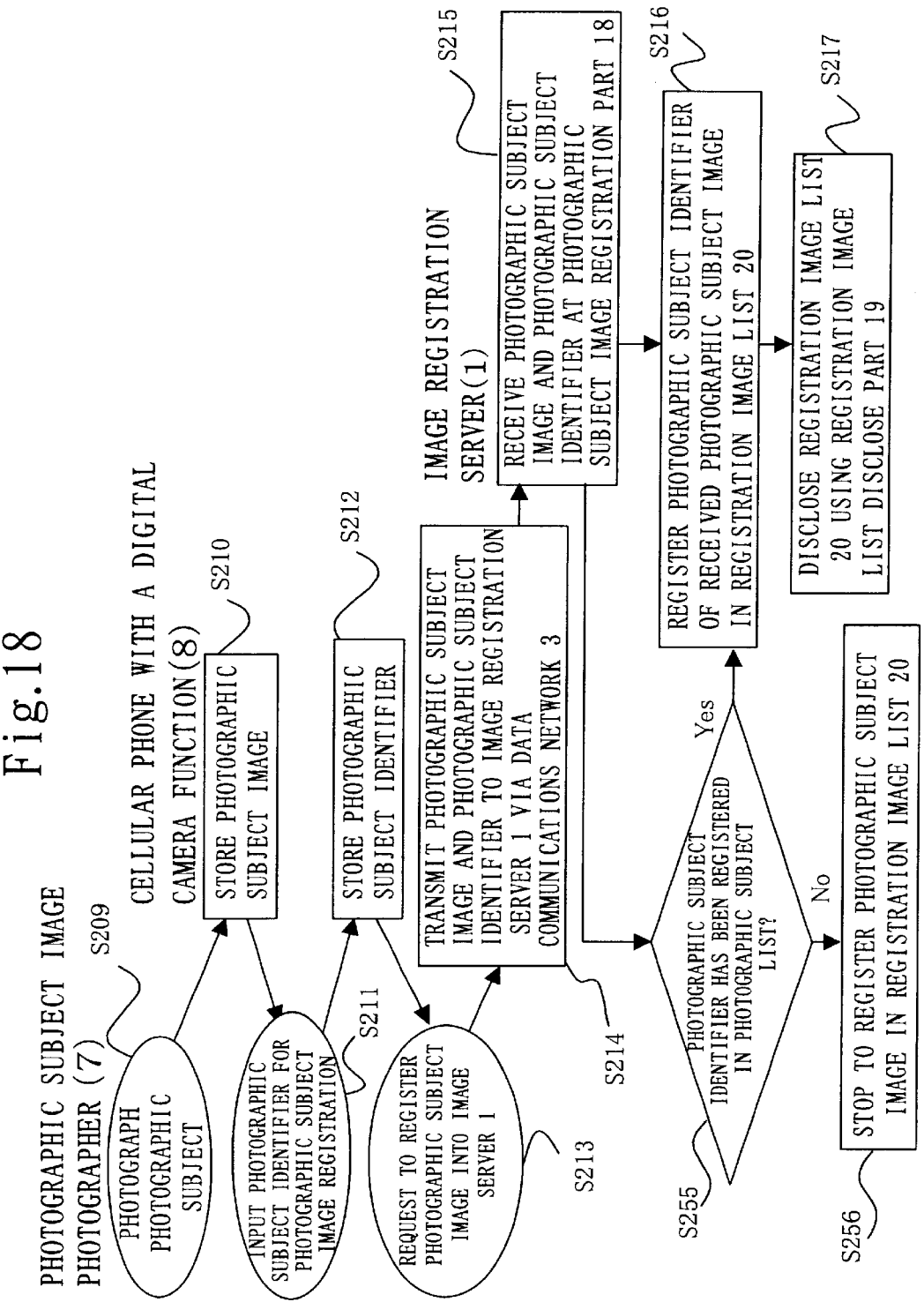
FIG. 18 shows a flowchart in the case of having a function to selectively accept to register an image, according to Embodiment 7.

When an image of a photographed specific photographic subject is to be registered in the image registration server, FIG. 18 shows a flowchart in the case of having the function to selectively accept to register the image in the image registration server 1 based on whether a photographic subject identifier has been previously registered in the photographic subject list or not.

The processes from S209 through S214 are the same as those of FIG. 8. The image registration server 1 receives a photographic subject image and its photographic subject identifier 31 from the cellular phone 8 with a digital camera function by the photographic subject image registration part 18 (S215). It is checked whether or not the received photographic subject identifier exists in the photographic subject list 12 (S255). When the received photographic subject identifier 31 exists in the photographic subject list 12, the photographic subject image and its photographic subject identifier 31 are stored in the image registration server 1, and the received photographic subject identifier 31 is written in the registration image list 20 (S216). Future procedures after this are the same as those of Embodiment 1.

On the other hand, when the photographic subject identifier 31 appended to the photographic subject image does not exist in the photographic subject list 12, the image registration server 1 cancels the received photographic subject image (S256), and refuses to receive the photographic subject image. Thus, it is possible to refuse the registration of the photographic subject image whose photographic subject identifier is not registered in the photographic subject list 12.

Embodiment 8.

Figure 19:
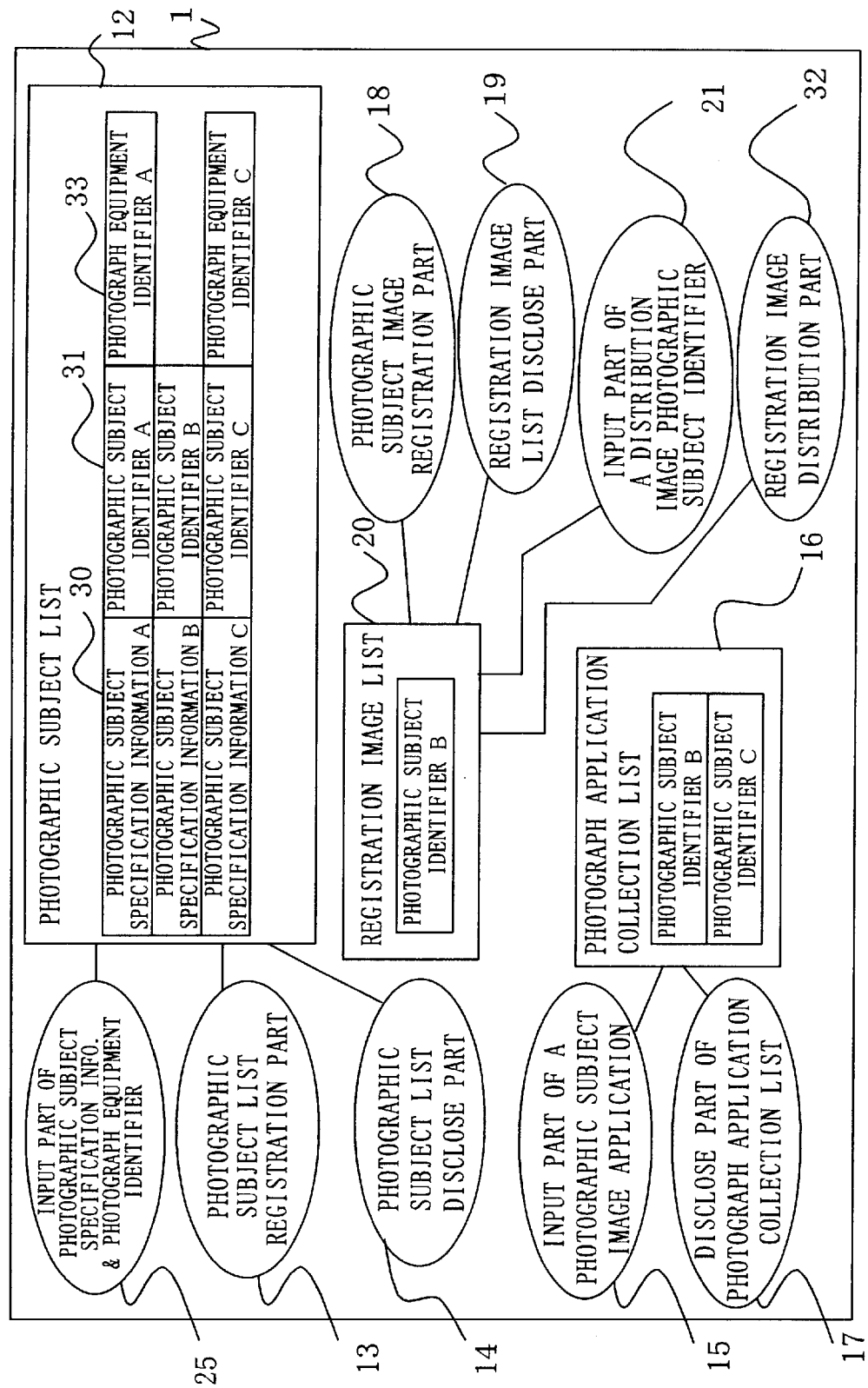
FIG. 19 shows a configuration of an image registration server according to Embodiment 8.

FIG. 19 shows a configuration of the image registration server according to Embodiment 8. An input part 25 of photographic subject specification information & a photograph equipment identifier inputs photographic subject specification information and a photograph equipment identifier into the image registration server. A photograph equipment identifier 33 is input by the photographic subject registrant 2 using the input part 25 of photographic subject specification information & photograph equipment identifier, and displayed in the photographic subject list 12. The photograph equipment identifier is used for specifying a photograph equipment to take a photograph. Other configuration elements are the same as those shown in FIG. 1.

Figure 20:
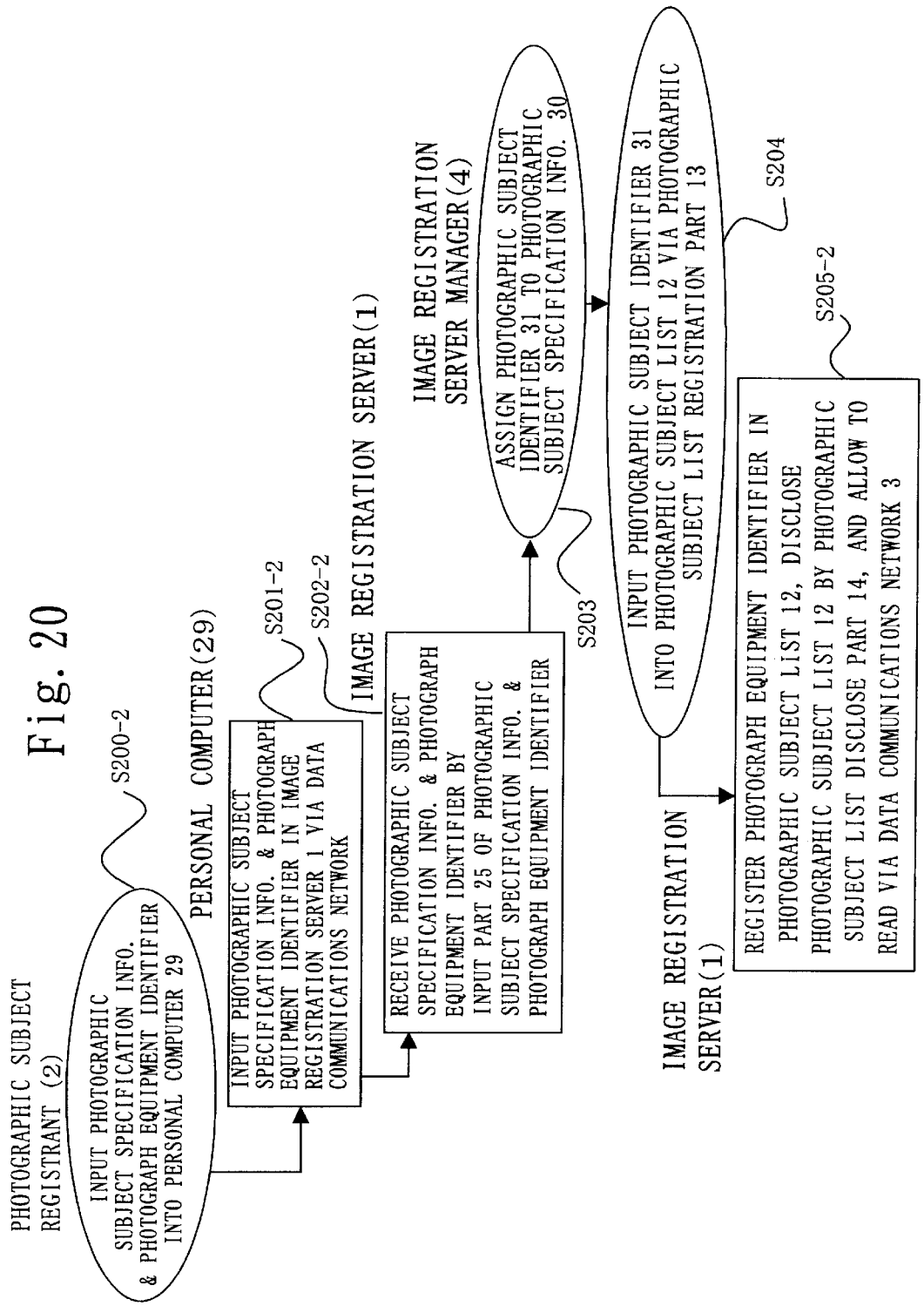
FIG. 20 shows a flow of a photographic subject registration which includes: inputting a photograph equipment identifier.

A processing flow will be explained. FIG. 20 shows a flow of a photographic subject registration which includes inputting a photograph equipment identifier. The photographic subject registrant 2 registers a photographic subject into the image registration server 1 via the data communications network 3 by using the personal computer 29, which is the same way as that in FIG. 3. At this time, a photograph equipment identifier is input. The photograph equipment identifier is information for specifying equipment to photograph. For example, in a cellular phone with a digital camera, the cellular phone number which specifies the terminal can be utilized. The photographic subject registrant 2 registers photographic subject information and a photograph equipment identifier for specifying a photographic subject by using the personal computer 29 (S200-2, S201-2).

When a gas utility company uses the present invention for the use of grasping a construction situation, information which specifies a photographic subject, such as a construction apparatus and a meter, is input respectively. Then, the cellular phone number of the cellular phone with a digital camera function which is used for photographing these photographic subjects is input as a photograph equipment identifier. As a background of specifying a photograph equipment, there is a reason that it should be limited to the person who has a specific qualification or the person who had a course, to photograph a photographic subject, such as a construction apparatus and a meter. The photographic subject specification information 30 and the photograph equipment identifier 33 are received through the input part 25 of photographic subject specification information & photograph equipment identifier of the image registration server 1 (S202-2). When it is not necessary to specify the photograph equipment for photographing a photographic subject, the same process as that of FIG. 3 is performed.

The image registration server manager 4 assigns the photographic subject identifier 31 to the photographic subject specification information 30 to complete the photographic subject list 12 (S204). If the photograph equipment identifier 33 has also been received at this time, the photograph equipment identifier 33 is registered into the photographic subject list 12 to be corresponding to the photographic subject identifier 31 (S205-2).

The process of disclosing the photographic subject list 12 is performed in the same way as FIG. 3. Then, an application is executed by the applicant 5 (from S206 to S207), and the photograph application collection list 16 is disclosed (S208). This is also the same as that of Embodiment 1.

The photographer 7 checks whether his photograph equipment (for example, a cellular phone 8 with a digital camera function) is the specified photograph equipment for the photographic subject indicated by the photographic subject identifier 31 in the photographic subject list 12. For instance, if a telephone number of a cellular phone with a digital camera function has been already registered as the photograph equipment identifier 33 by the photographic subject registrant 2, the photographer 7 can know whether his cellular phone 8 with a digital camera function is the specified equipment or not before taking a photograph.

Figure 21:
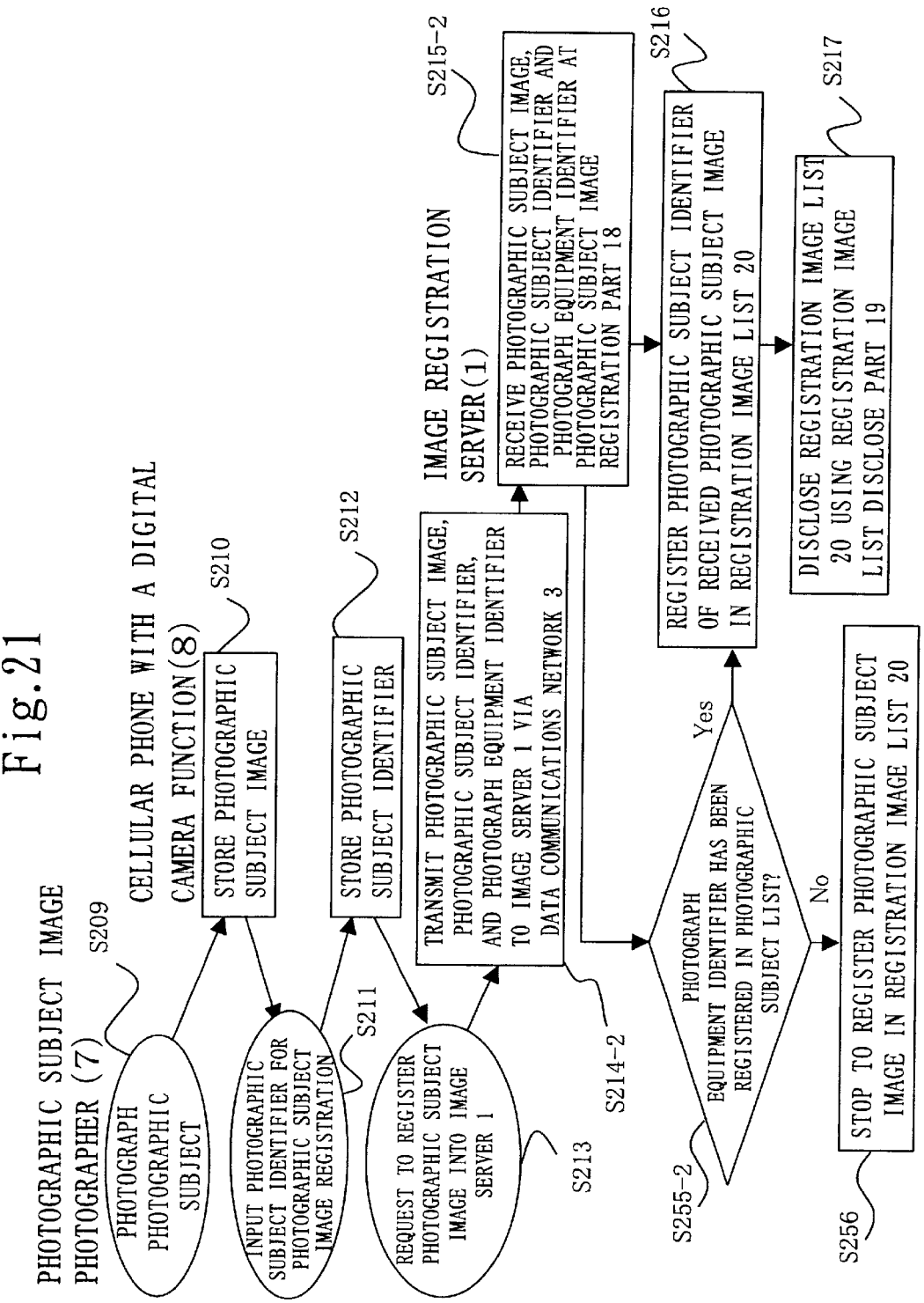
FIG. 21 is a flowchart showing a registration judgment by using a photograph equipment identifier, for the image registration server.

FIG. 21 is a flowchart showing a registration judgment by using a photograph equipment identifier, for the image registration server. After the photographer 7 photographing the photographic subject 9 (S209), he registers the photographed photographic subject image into the image registration server 1 (from S210 to S214). It is possible for the photographer 7 to try to register the photographic subject image from the cellular phone 8 with a digital camera function to the image registration server 1 through the data communications network 3, even if the photographer 7 does not check whether the photograph equipment identifier 33 of his cellular phone 8 with a digital camera function is written in the photographic subject list 12 or not (from S213 to S214). The cellular phone 8 with a digital camera function notifies the photographic subject image registration part 18 of the photograph equipment identifier 33 (for example, a dispatch number of a cellular phone) (S215-2). The photographic subject image registration part 18 which was notified of the photograph equipment identifier specifies the photograph equipment identifier 33 in the photographic subject list 12 to be corresponding to the photographic subject identifier 31 appended to the sent photographic subject image. Then, the specified photograph equipment identifier 33 in the photographic subject list 12 is compared with the sent photograph equipment identifier (S255-2). If the photographic subject image was taken by the specified portable equipment, the photographic subject image will be registered into the image registration server 1 (S216). If the photographic subject image was taken by portable equipment other than the specified portable equipment, the image registration server 1 can refuse the registration of the sent photographic subject image (S256). Subsequent operations are the same as those in Embodiment 1.

Embodiment 9.

Figure 22:
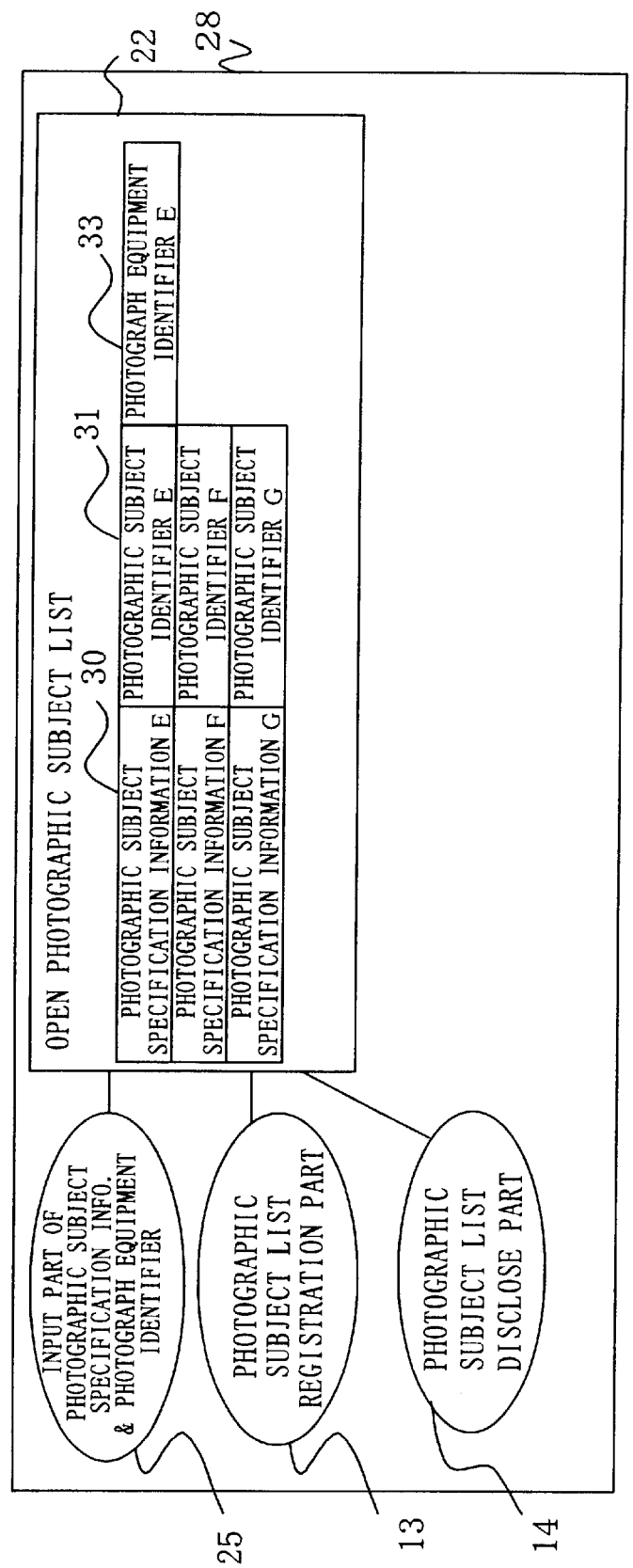
FIG. 22 shows a configuration of a photographic subject identifier manage server according to Embodiment 9.

FIG. 22 shows a configuration of the photographic subject identifier manage server according to Embodiment 9. The input part 25 of photographic subject specification information & a photograph equipment identifier inputs photographic subject specification information and a photograph equipment identifier into the image registration server. The photograph equipment identifier 33 is input by the photographic subject registrant 2 using the input part 25 of photographic subject specification information & photograph equipment identifier, and displayed in the open photographic subject list 22. The photograph equipment identifier is as stated above. The input part 25 of photographic subject specification information & a photograph equipment identifier, and the photograph equipment identifier 33 have the same functions as those in Embodiment 8. Other configuration elements are the same as those shown in FIG. 4.

Figure 23:
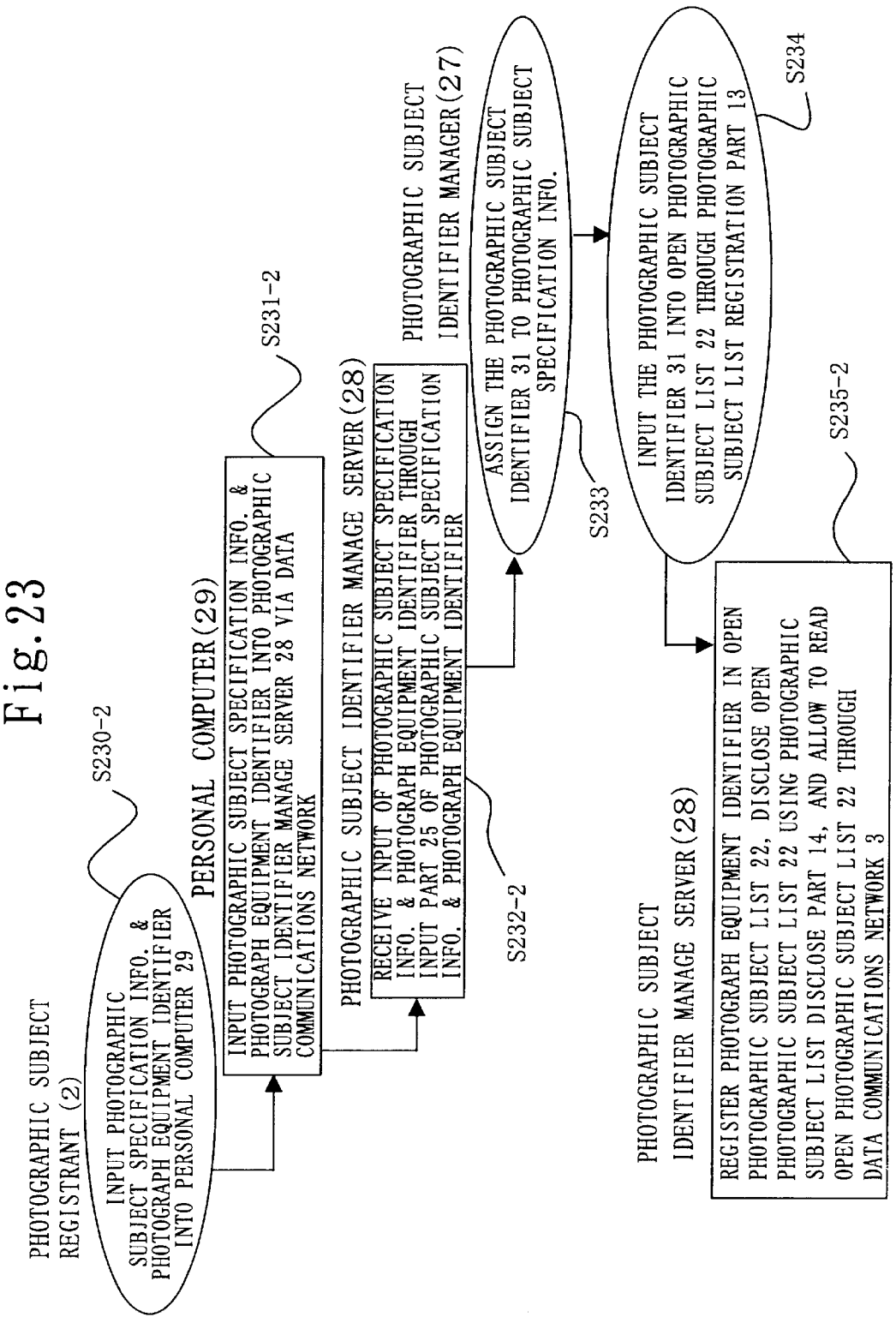
FIG. 23 shows a flow of registering photographic subject information and a photograph equipment identifier in the photographic subject identifier manage server.

The operation of a registration processing of a photograph equipment identifier will now be explained. FIG. 23 shows a flow of registering photographic subject information and a photograph equipment identifier in the photographic subject identifier manage server. At the time of registering a photographic subject, the photographic subject registrant 2 also registers a photograph equipment identifier. The photographic subject registrant 2 registers photographic subject information for specifying a photographic subject and a photograph equipment identifier by using the personal computer 29 (S230-2, S231-2). These photographic subject information and photograph equipment identifier are transmitted to the input part 25 of photographic subject specification information & photograph equipment identifier, of the photographic subject identifier manage server 28 via the data communications network 3 (S232-2). The photographic subject specification information 30 and the photograph equipment identifier 33 are written in the open photographic subject list 22 of the photographic subject identifier manage servers 28, and the photographic subject identifier 31 is assigned to the photographic subject by the photographic subject identifier manager 27 (S233). The photographic subject identifier 31 is input to complete the open photographic subject list 22 through the photographic subject list registration part 13 (S234). The completed open photographic subject list 22 is disclosed to the public by the photographic subject list disclose part 14 (S235).

Figure 24:
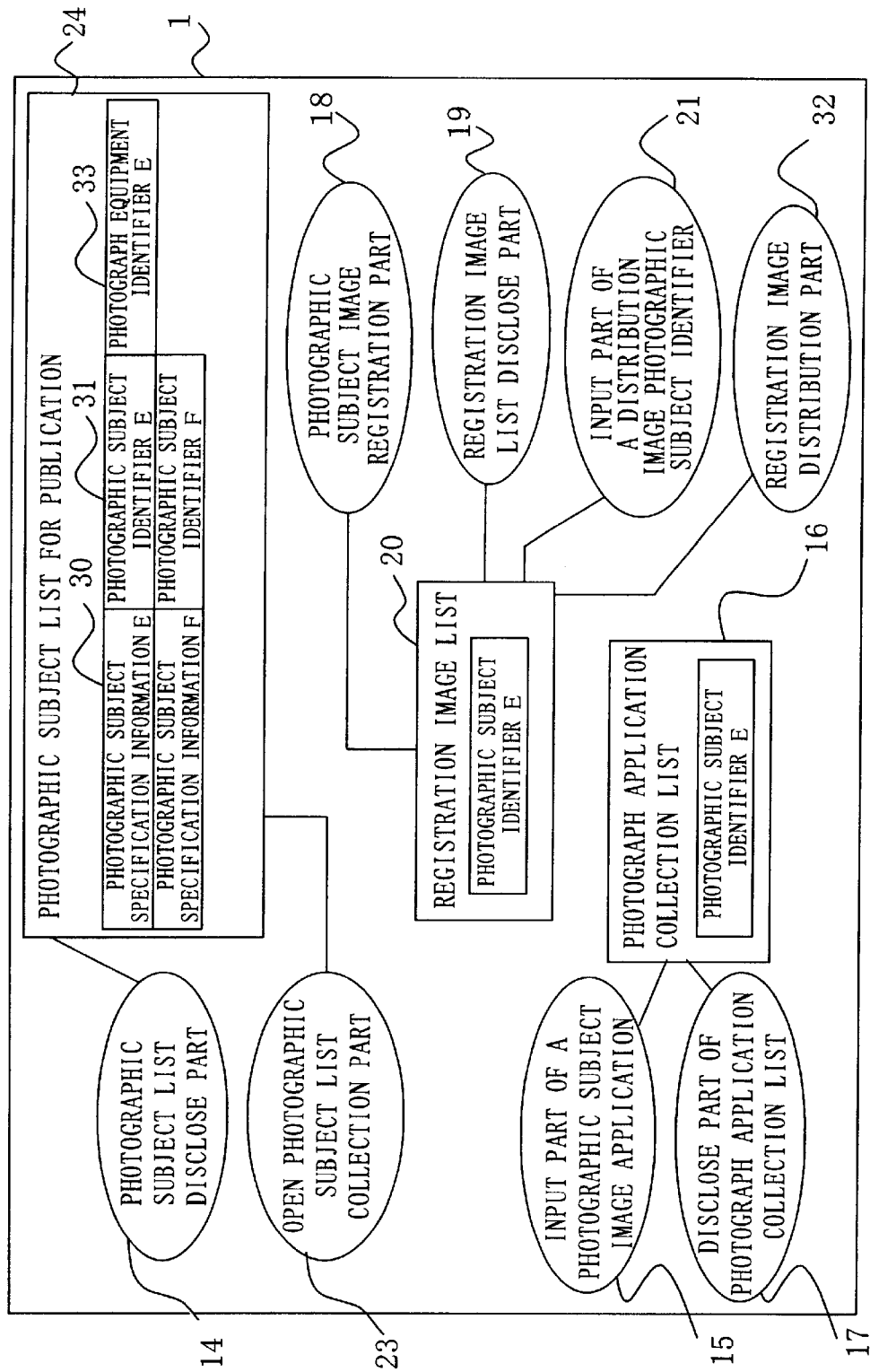
FIG. 24 shows a configuration of an image registration server according to Embodiment 9.
Figure 25:
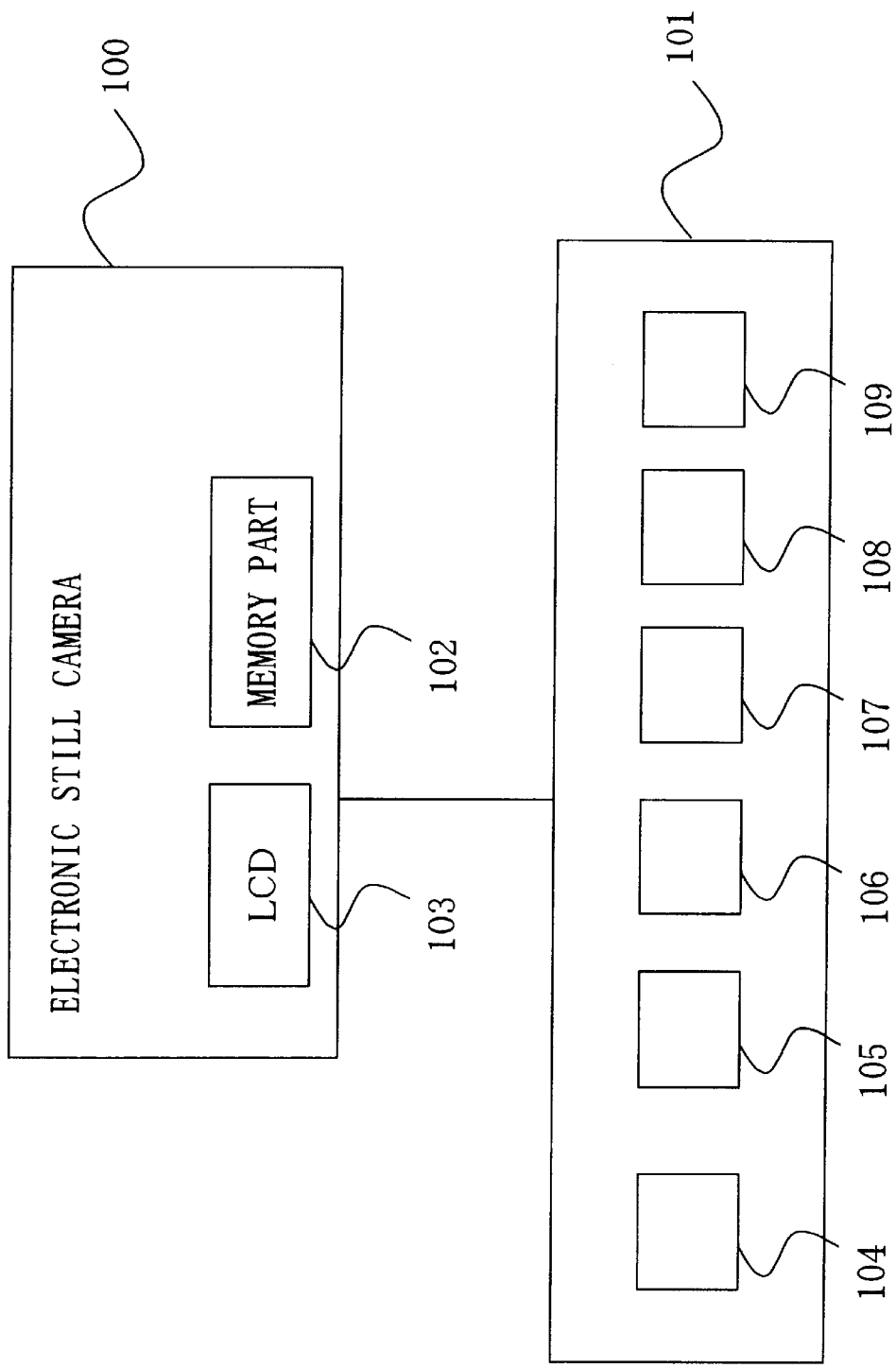
FIG. 25 shows a configuration illustrating a recording classification system for an electronic still camera according to the conventional art example 1.
Figure 26:
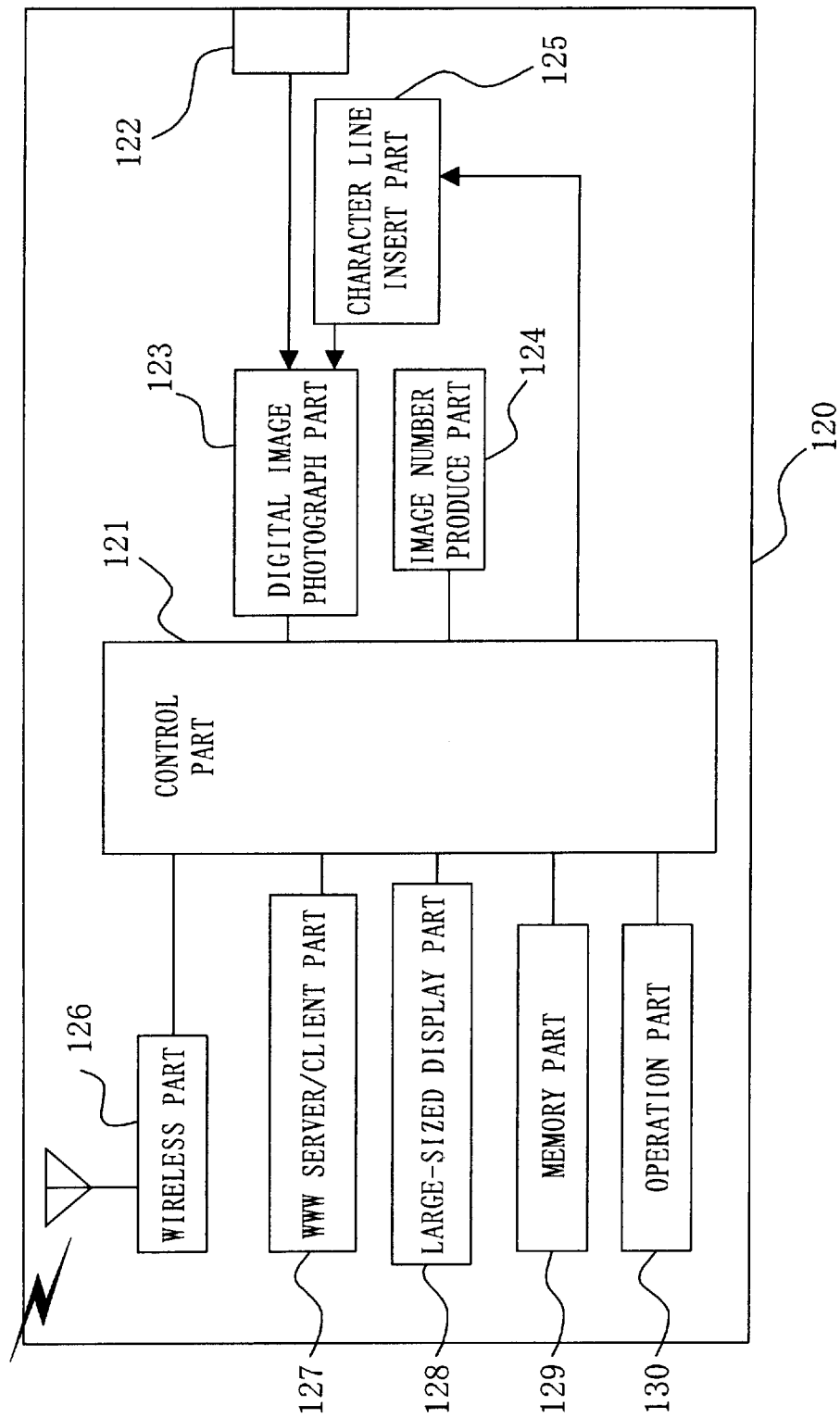
FIG. 26 shows a photograph image specification using an image number and a transmission system described in "Digital Camera" according to the conventional art example 2.
Figure 27:
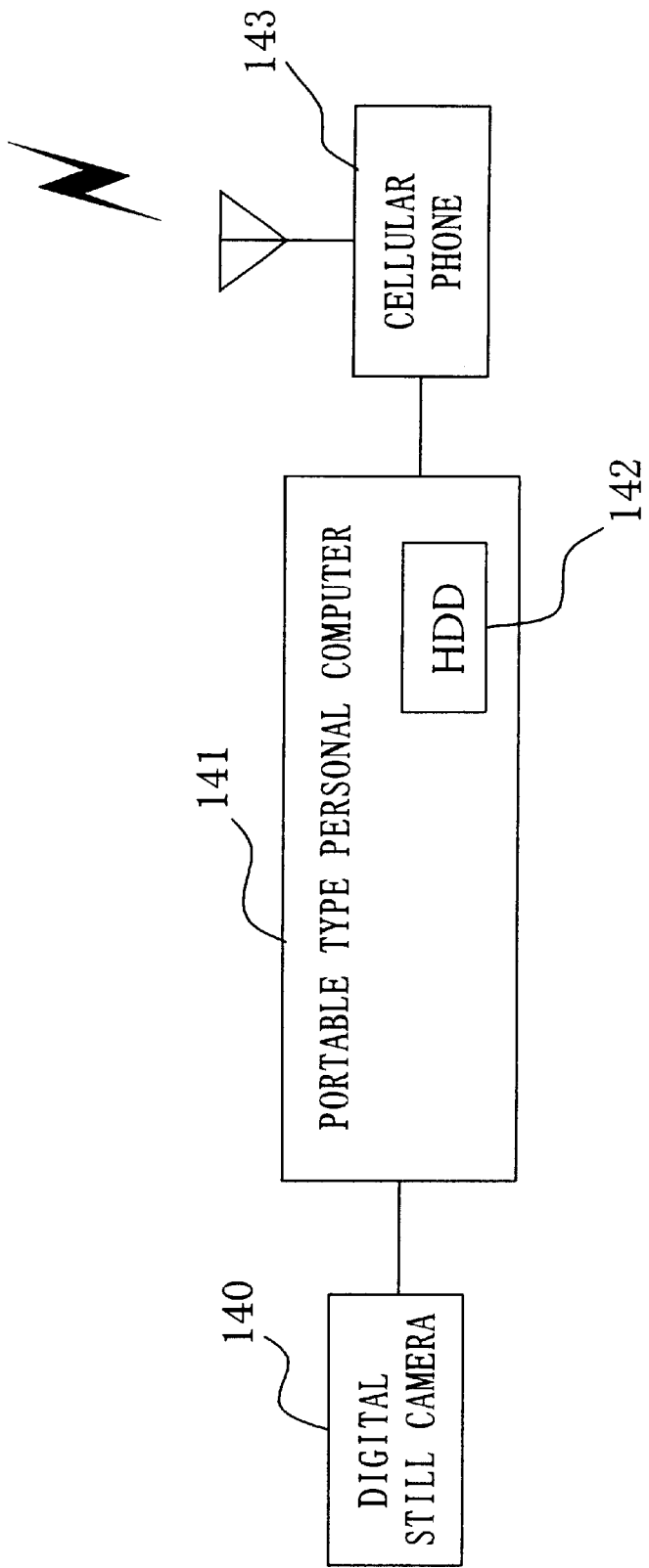
FIG. 27 shows a configuration of information terminal side according to an image file management system by using a symbol ID described in the conventional art example 3.

FIG. 24 shows a configuration of the image registration server according to Embodiment 9. Based on the process of FIG. 15, the image registration server 1 collects, via the data communications network 3 by using the open photographic subject list collection part 23, the photographic subject specification information 30, the photographic subject identifier 31 and the photograph equipment identifier 33 about the photographic subject to be displayed in his photographic subject list 24 for publication, from the open photographic subject list 22 disclosed on the photographic subject identifier manage server 28 (S236, S237). The image registration server manager 4 selects only the photographic subject which the image registration server 1 discloses, and the image registration server manager 4 puts the selected photographic subject in the photographic subject list 24 for publication. Then, the photographic subject list 24 for publication is disclosed through the data communications network 3 by the photographic subject list disclose part 14 (S238). Subsequent operations are the same as those of Embodiment 8.

In executing the present invention, it is necessary to consider the rights to a portrait of the photographic subject, the copyright of the photographic subject, and the ownership of the photographic subject. Especially, the image registration server manager and the photographic subject identification manager need to be very cautious about each procedure. If the execution of the present invention is limited to be performed only in the company, there is a possibility that the above-mentioned consideration might be less.

INDUSTRIAL APPLICABILITY

According to the present invention, as explained with reference to Embodiments 1-A and 1-B, the procedure of application to acquire a photographic subject image which an applicant wants to acquire, performed for the image registration server by the applicant can be simplified by using a photographic subject identifier, and the application can be simply performed by utilizing a cellular phone. Moreover, according to the present invention, it is possible to easily inform a photographer of the photographic subject whose photograph is currently being desired. Furthermore, when a photographed photographic subject image is registered in the image registration server, it is possible to simplify the procedure for specifying an image corresponding to the photographic subject. Therefore, the image registration can be simply performed using a cellular phone with a digital camera. When the applicant downloads a photographic subject image registered in the registration server, specifying the photographic subject image in the image registration server can be simplified. By utilizing a cellular phone, it is possible to simply perform the image registration and the image search.

Furthermore, as described with reference to Embodiments 2-A and 2-B, the present invention has an effect, by using a photographic subject identifier, that it is possible to request to take a photograph of a specific photographic subject from many and unspecified photographers, and to have many and unspecified men simply, by using a cellular phone for example, watch information about the image photographed by the photographer.

What is claimed is:

1. An image registration server, which can be connected, through a data communications network, to a registrant terminal used by a registrant who registers a photographic subject to be photographed, to an applicant terminal used by an applicant who wants the photographic subject to be photographed and an image of the photographic subject to be distributed, and to a photographer terminal used by a photographer who photographs the photographic subject, the image registration server comprising:

1) an input part of photographic subject specification information, for inputting photographic subject specification information which specifies the photographic subject, from the registrant terminal through the data communications network;

2) a photographic subject list registration part for registering a photographic subject list where input photographic subject specification information corresponds to a photographic subject identifier for identifying the photographic subject;

3) a photographic subject list disclose part for disclosing a registered photographic subject list to the applicant terminal and the photographer terminal through the data communications network;

4) an input part of a photographic subject image application, for inputting the photographic subject identifier which specifies the photographic subject whose photograph the applicant wants to be photographed, from the applicant terminal through the data communications network;

5) a photograph application collection list disclose part for disclosing a photograph application collection list including an input photographic subject identifier to the photographer terminal through the data communications network, and for urging the photographer to photograph the photographic subject;

6) a photographic subject image registration part for inputting the image of the photographic subject and the photographic subject identifier of the photographic subject from the photographer terminal through the data communications network, and for registering an input image of the photographic subject and an input photographic subject identifier of the photographic subject;

7) a registration image list disclose part for disclosing a registration image list including the photographic subject identifier of the photographic subject to the applicant terminal through the data communications network, and for urging the applicant to acquire the image;

8) an input part of a distribution image photographic subject identifier, for inputting the photographic subject identifier which identifies the photographic subject of the image requested to be distributed, from the applicant terminal through the data communications network; and 9) a registration image distribution part for distributing the image of the photographic subject identified by an input photographic subject identifier to the applicant terminal through the data communications network.

2. An image intermediary distribution system comprising:

a photographic subject identifier manage server which can be connected, through a data communications network, to a registrant terminal used by a registrant who registers a photographic subject to be photographed; and an image registration server which can be connected, through the data communications network, to an applicant terminal used by an applicant who wants the photographic subject to be photographed and an image of the photographic subject to be distributed, to a photographer terminal used by a photographer who photographs the photographic subject, and to the photographic subject identifier manage server, wherein the photographic subject identifier manage server including:

an input part of photographic subject specification information, for inputting photographic subject specification information which specifies the photographic subject, from the registrant terminal through the data communications network;

a photographic subject list registration part for registering an open photographic subject list where input photographic subject specification information corresponds to a photographic subject identifier for identifying the photographic subject; and a photographic subject list disclose part for disclosing a registered open photographic subject list to public people through the data communications network, wherein the image registration server including:

an open photographic subject list collection part for inputting at least a part of the open photographic subject list from the photographic subject identifier manage server through the data communications network, and for registering an input open photographic subject list as a photographic subject list;

an input part of a photographic subject image application, for inputting the photographic subject identifier which specifies the photographic subject whose photograph the applicant wants to be photographed, from the applicant terminal through the data communications network;

a photograph application collection list disclose part for disclosing a photograph application collection list including an input photographic subject identifier to the photographer terminal through the data communications network, and for urging the photographer to photograph the photographic subject;

a photographic subject image registration part for inputting the image of the photographic subject and the photographic subject identifier of the photographic subject from the photographer terminal through the data communications network, and for registering an input image of the photographic subject and an input photographic subject identifier of the photographic subject;

a registration image list disclose part for disclosing a registration image list including the photographic subject identifier of the photographic subject to the applicant terminal through the data communications network, and for urging the applicant to acquire the image;

an input part of a distribution image photographic subject identifier, for inputting the photographic subject identifier which identifies the photographic subject of the image requested to be distributed, from the applicant terminal through the data communications network; and a registration image distribution part for distributing the image of the photographic subject identified by an input photographic subject identifier to the applicant terminal through the data communications network.

3. The image registration server of the claim 1, wherein the input part of a photographic subject image application inputs the photographic subject identifier composed of numbers and signs assigned to dial buttons of a cellular phone terminal, from the cellular phone terminal being the applicant terminal.

4. The image intermediary distribution system of claim 2, wherein the input part of a photographic subject image application inputs the photographic subject identifier composed of numbers and signs assigned to dial buttons of a cellular phone terminal, from the cellular phone terminal being the applicant terminal.

5. The image registration server of the claim 1, wherein the photographic subject image registration part inputs the photographic subject identifier composed of numbers and signs assigned to dial buttons of a cellular phone terminal, from the cellular phone terminal being the photographer terminal.

6. The image intermediary distribution system of claim 2, wherein the photographic subject image registration part inputs the photographic subject identifier composed of numbers and signs assigned to dial buttons of a cellular phone terminal, from the cellular phone terminal being the photographer terminal.

7. The image registration server of the claim 1, wherein the input part of a photographic subject image application inputs the photographic subject identifier composed of numbers, signs, alphabets, and pause marks from a cellular phone terminal being the applicant terminal.

8. The image intermediary distribution system of claim 2, wherein the input part of a photographic subject image application inputs the photographic subject identifier composed of numbers, signs, alphabets, and pause marks from a cellular phone terminal being the applicant terminal.

9. The image registration server of the claim 1, wherein the photographic subject image registration part inputs the photographic subject identifier composed of numbers, signs, alphabets, and pause marks from a cellular phone terminal being the photographer terminal.

10. The image intermediary distribution system of claim 2, wherein the photographic subject image registration part inputs the photographic subject identifier composed of numbers, signs, alphabets, and pause marks from a cellular phone terminal being the photographer terminal.

11. The image registration server of the claim 1, wherein the photographic subject image registration part registers when the input photographic subject identifier corresponds to the photographic subject identifier included in the photographic subject list.

12. The image intermediary distribution system of claim 2, wherein the photographic subject image registration part registers when the input photographic subject identifier corresponds to the photographic subject identifier included in the photographic subject list.

13. The image registration server of the claim 1, wherein the input part of photographic subject specification information further inputs a photograph equipment identifier for identifying photograph equipment, the photographic subject list registration part further registers the photographic subject list where an input photograph equipment identifier corresponds to the photographic subject identifier, and the photographic subject image registration part further inputs the photograph equipment identifier for identifying the photograph equipment used for photographing the image and registers when the input photograph equipment identifier corresponds to the photograph equipment identifier included in the photographic subject list.

14. The image intermediary distribution system of claim 2, wherein the input part of photographic subject specification information further inputs a photograph equipment identifier for identifying photograph equipment, the photographic subject list registration part further registers the photographic subject list where an input photograph equipment identifier corresponds to the photographic subject identifier, and the photographic subject image registration part further inputs the photograph equipment identifier for identifying the photograph equipment used for photographing the image and registers when the input photograph equipment identifier corresponds to the photograph equipment identifier included in the photographic subject list.

* * * * *